US012595893B2

(12) United States Patent
Ito et al.

(10) Patent No.: US 12,595,893 B2
(45) Date of Patent: Apr. 7, 2026

(54) PLANAR ILLUMINATION DEVICE

(71) Applicant: MINEBEA MITSUMI Inc., Nagano (JP)

(72) Inventors: Ginga Ito, Kitasaku-gun (JP); Masaya Fujiwara, Kitasaku-gun (JP)

(73) Assignee: MINEBEA MITUSMI Inc., Nagano (JP)

( * ) Notice: Subject to any disclaimer, the term of this patent is extended or adjusted under 35 U.S.C. 154(b) by 0 days.

(21) Appl. No.: 18/842,918

(22) PCT Filed: Dec. 22, 2022

(86) PCT No.: PCT/JP2022/047260
§ 371 (c)(1),
(2) Date: Aug. 30, 2024

(87) PCT Pub. No.: WO2023/166826
PCT Pub. Date: Sep. 7, 2023

(65) Prior Publication Data
US 2025/0198594 A1 Jun. 19, 2025

(30) Foreign Application Priority Data
Mar. 1, 2022 (JP) ................................ 2022-030906

(51) Int. Cl.
*F21V 5/00* (2018.01)
*F21V 5/04* (2006.01)
(Continued)

(52) U.S. Cl.
CPC .............. *F21V 5/007* (2013.01); *F21V 5/043* (2013.01); *F21V 5/045* (2013.01); *G02B 3/0062* (2013.01);
(Continued)

(58) Field of Classification Search
CPC .......... F21V 5/007; F21V 5/043; F21V 5/045; F21Y 2105/10; G02B 3/0062;
(Continued)

(56) References Cited

U.S. PATENT DOCUMENTS 9,618,179 B2 4/2017 Michiels et al.
2004/0080938 A1* 4/2004 Holman .................. F21S 41/12
362/245
(Continued)

FOREIGN PATENT DOCUMENTS

JP 2011-033643 A 2/2011
JP 2012-203092 A 10/2012
(Continued)

OTHER PUBLICATIONS

English translation of Written Opinion for corresponding International Application No. PCT/JP2022/047260 mailed Mar. 14, 2023.
(Continued)

*Primary Examiner* — Tracie Y Green
*Assistant Examiner* — Michael Chiang
(74) *Attorney, Agent, or Firm* — Chrisman Gallo Tochtrop LLC

(57) ABSTRACT

A planar illumination device according to an embodiment includes a substrate, a first optical element, a second optical element, a third optical element, a pair of fourth and fifth optical elements, and a sixth optical element. A plurality of light sources are two-dimensionally arranged on the substrate. The first optical element is arranged at an emission side of the plurality of light sources to condense light emitted from the plurality of light sources. The second optical element is arranged at an emission side of the first optical element to tilt light distribution of the light condensed by the first optical element in a first axial direction within an emission surface. The third optical element is (Continued)

arranged at an emission side of the second optical element to spread the light tilted by the second optical element in the first axial direction. The pair of fourth and fifth optical elements are arranged at the emission side of the plurality of light sources to spread light in a second axial direction orthogonal to the first axial direction within an emission surface. The sixth optical element is formed by combining the second optical element and the third optical element to substitute for the second optical element and the third optical element.

14 Claims, 24 Drawing Sheets

(51) Int. Cl.

| | | |
|---|---|---|
| *G02B 3/00* | (2006.01) | |
| *G02F 1/1335* | (2006.01) | |
| *G02F 1/13357* | (2006.01) | |
| *F21Y 105/10* | (2016.01) | |

(52) U.S. Cl.
CPC ..... *G02B 3/0068* (2013.01); *G02F 1/133606* (2013.01); *G02F 1/133607* (2021.01); *G02F 1/133611* (2013.01); *F21Y 2105/10* (2016.08)

(58) Field of Classification Search
CPC ............. G02B 3/0068; G02F 1/133607; G02F 1/133611; G02F 1/133606
See application file for complete search history.

(56) References Cited

U.S. PATENT DOCUMENTS

| | | | | |
|---|---|---|---|---|
| 2008/0037947 | A1* | 2/2008 | Chao | G02B 3/0043 385/146 |
| 2010/0231823 | A1* | 9/2010 | Goto | G02B 3/0006 362/311.01 |
| 2016/0298822 | A1* | 10/2016 | Michiels | F21V 5/002 |
| 2022/0155589 | A1 | 5/2022 | Hirata et al. | |
| 2023/0213167 | A1* | 7/2023 | Mukumoto | F21V 5/045 362/97.1 |
| 2024/0247777 | A1* | 7/2024 | Ito | F21V 5/04 |

FOREIGN PATENT DOCUMENTS

| | | | |
|---|---|---|---|
| JP | 2012-215895 | A | 11/2012 |
| JP | 2015-537360 | A | 12/2015 |
| JP | 2020-134633 | A | 8/2020 |

OTHER PUBLICATIONS

International Search Report for corresponding International Application No. PCT/JP2022/047260 mailed Mar. 14, 2023.
Written Opinion for corresponding International Application No. PCT/JP2022/047260 dated Mar. 14, 2023.

* cited by examiner

LUMINANCE CROSS-SECTIONAL PROFILE BY SINGLE LIGHTING

[A-A CROSS-SECTIONAL VIEW]

[A-A CROSS-SECTIONAL VIEW]

[A-A CROSS-SECTIONAL VIEW]

[A-A CROSS-SECTIONAL VIEW]

[LONGITUDINAL CROSS SECTION]

[TRANSVERSE CROSS SECTION]

[LONGITUDINAL CROSS SECTION]

[TRANSVERSE CROSS SECTION]

[LONGITUDINAL CROSS SECTION]

[TRANSVERSE CROSS SECTION]

PLANAR ILLUMINATION DEVICE

TECHNICAL FIELD

The present invention relates to a planar illumination device.

BACKGROUND ART

As a planar illumination device used for a backlight of a liquid crystal panel or the like, there is a direct-type planar illumination device having light sources (point light sources) such as light emitting diodes (LEDs) being two-dimensionally arranged, for example, in a lattice shape. In such a direct-type planar illumination device, a diffusion plate is often provided in order to suppress luminance unevenness caused by a difference in brightness occurring between the portion of a light source and the portion between adjacent light sources on a light-emitting surface, and chromaticity unevenness caused by insufficient color mixing for pseudo white. However, since the diffusion plate diffuses light in all directions resulting in light being radiated in unnecessary directions, the light use efficiency becomes lower. For this reason, instead of using such a diffusion plate, a lenticular lens capable of spreading light in a predetermined angle range may be provided. A lenticular lens has a large number of fine concave and convex grooves in one direction, and when it is desired to spread light in a horizontal direction and a vertical direction, lenticular lenses are provided in two directions orthogonal to each other within an emission surface, respectively.

In addition, in such a direct-type planar illumination device, light from a light source is condensed by a linear Fresnel lens having concave and convex grooves extending in one direction (for example, a lateral direction or a horizontal direction when a user directly or indirectly views an emission surface), and the optical axis is tilted by a peak shift prism having concave and convex grooves extending in the same direction as the linear Fresnel lens to realize a narrow light distribution in a direction orthogonal to the grooves (for example, a longitudinal direction or a vertical direction) (for example, see Patent Documents 1 and 2). In this case, because light is not condensed in the direction of the grooves of the linear Fresnel lens or the peak shift prism (for example, the lateral direction or the horizontal direction), the light is widely distributed.

Since the lenticular lenses are provided in two directions orthogonal to each other within the emission surface, respectively as described above, the luminance unevenness and the chromaticity unevenness caused by the pitch of the light sources are suppressed to some extent, but the suppression may be insufficient in a direction with a wide light distribution. However, although the luminance unevenness and chromaticity unevenness caused by the pitch of the light sources are not very conspicuous in a direction with a narrow light distribution (for example, the longitudinal direction or the vertical direction) due to light condensing, the luminance unevenness and chromaticity unevenness of streaks (the direction of the streaks is, for example, the longitudinal direction or the vertical direction) caused by the pitch of the light sources are conspicuous in the direction with a wide light distribution (for example, the lateral direction or the horizontal direction).

Further, in a case of no linear Fresnel lens or peak shift prism being provided and no light distribution being narrow in one direction, that is, in a case of light distribution being wide in both directions, the lattice-shaped luminance unevenness and chromaticity unevenness caused by the pitch of the light sources becomes conspicuous.

On the other hand, in the above-described configuration with the optical axis being tilted by the linear Fresnel lens or the peak shift prism, the number of lenses is large due to an enlargement in the lens functional surfaces, and thus from the viewpoint of reducing the number of components and cost, it is desired to reduce the number of lenses. In addition, since loss resulting from absorption of light, surface reflection, or the like is reduced by reducing the number of lenses, improvement in the light use efficiency can be expected.

CITATION LIST

Patent Literature

Patent Document 1: JP 2020-134633 A
Patent Document 2: JP 2012-203092 A

SUMMARY OF INVENTION

Technical Problem

As described above, in the conventional direct-type planar illumination device, reduction in luminance unevenness and chromaticity unevenness is desired, and reduction in the number of lenses is desired.

The present invention has been made in view of the above circumferences, and an object is to provide a direct-type planar illumination device being a planar illumination device capable of reducing luminance unevenness and chromaticity unevenness and reducing the number of lenses.

Solution to Problem

To solve the above-described problems and fulfill the object, a planar illumination device according to an aspect of the present invention includes a substrate, a first optical element, a second optical element, a third optical element, a pair of fourth and fifth optical elements, and a sixth optical element. A plurality of light sources are two-dimensionally arranged on the substrate. The first optical element is arranged at an emission side of the plurality of light sources to condense light emitted from the plurality of light sources. The second optical element is arranged at an emission side of the first optical element to tilt light distribution of the light condensed by the first optical element in a first axial direction within an emission surface. The third optical element is arranged at an emission side of the second optical element to spread the light tilted by the second optical element in the first axial direction. The pair of fourth and fifth optical elements are arranged at an emission side of the plurality of light sources to spread light in a second axial direction orthogonal to the first axial direction within an emission surface. The sixth optical element is formed by combining the second optical element and the third optical element to substitute for the second optical element and the third optical element.

The planar illumination device according to an aspect of the present invention can reduce luminance unevenness and chromaticity unevenness and reduce the number of lenses.

DESCRIPTION OF EMBODIMENTS

Figure 1:
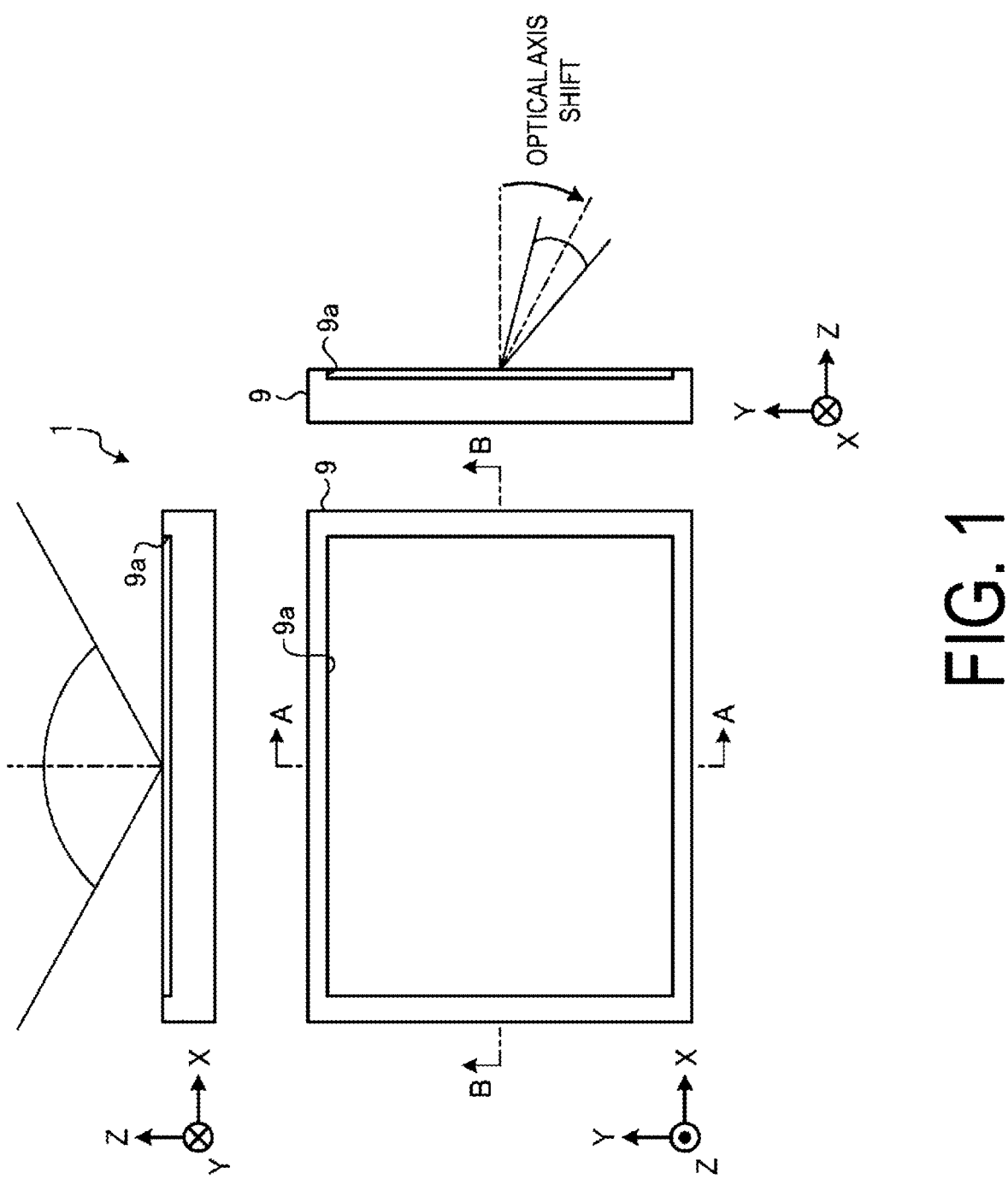
FIG. 1 is a view illustrating a configuration example of a planar illumination device according to a first embodiment.

A planar illumination device according to each of embodiments is described below with reference to the drawings. Further, this invention is not limited to the embodiments. Furthermore, the dimensional relationships between elements, proportions of the elements, and the like in the drawings may differ from reality. The drawings may include parts having mutually different dimensional relationships and scales. Furthermore, the contents described in one embodiment or modification are likewise applied in principle to other embodiments or modifications.

First Embodiment

FIG. 1 is a view illustrating a configuration example of a planar illumination device 1 according to a first embodiment, and the center part is a view taken from the direction facing a light-emitting surface (emission surface), the right part is an A-A cross-sectional view, and the top part is a B-B cross-sectional view. For convenience, in FIG. 1, the light-emitting surface of the planar illumination device 1 is within the X-Y plane and the thickness direction of the planar illumination device 1 is defined as a Z direction.

In FIG. 1, the planar illumination device 1 has a substantially rectangular plate-like outer shape, and light is emitted from the inside of an opening 9a of a frame 9. Further, the outer shape of the planar illumination device 1 is not limited to the shape illustrated in the drawing. The "optical axis shift" shown in the drawing means that the optical axis is tilted. The optical axis shift may also be referred to as a peak shift. Further, in some applications, the optical axis shift may not be performed.

In the example illustrated in FIG. 1, the optical axis is tilted to the negative direction side of the Y-axis of the planar illumination device 1 (obliquely lower right in the drawing), and it is illustrated that a narrow visual field range has been realized. On the other hand, in the example illustrated in FIG. 1, as the light distribution characteristics in the X-axis direction of the planar illumination device 1, it is illustrated that a wide visual field range has been realized with the normal direction of the light-emitting surface as the optical axis.

Figure 2:
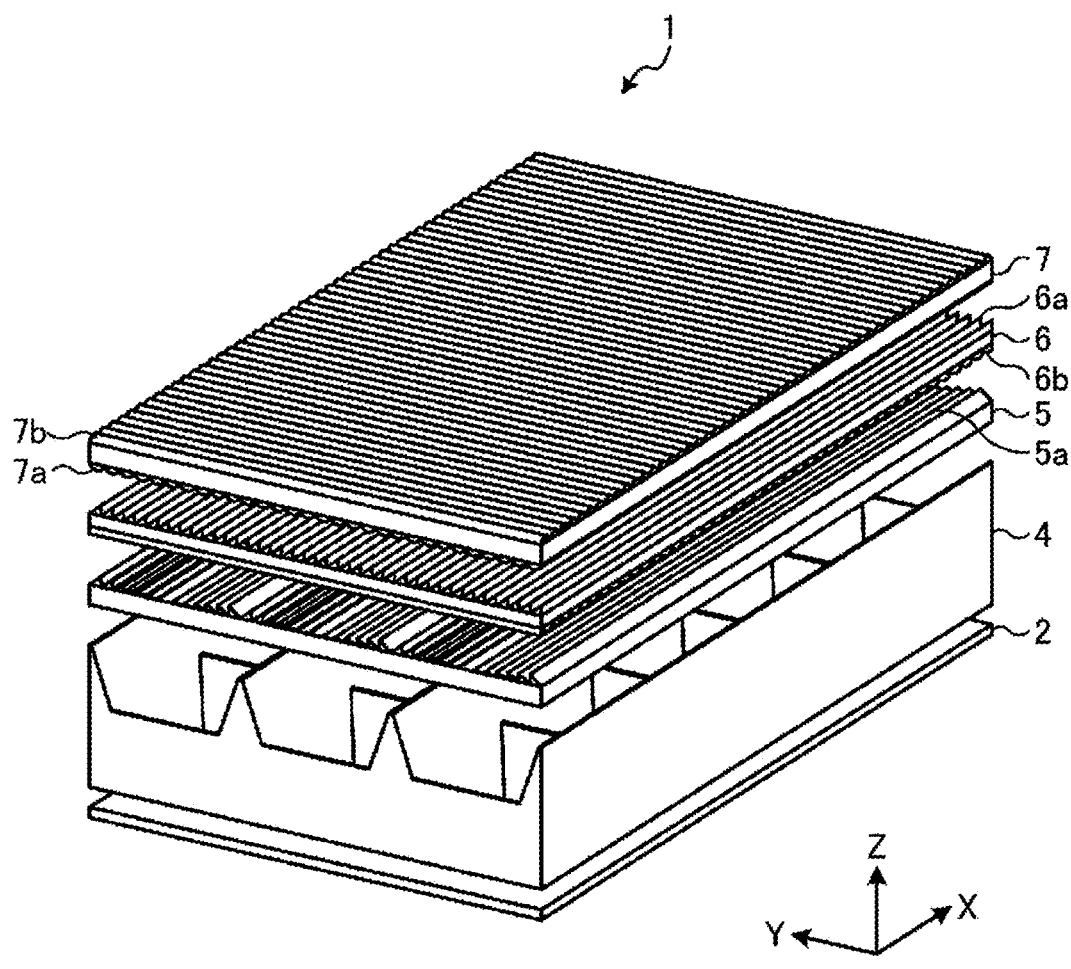
FIG. 2 is a perspective view schematically illustrating a configuration of the planar illumination device illustrated in FIG. 1.
Figure 3:
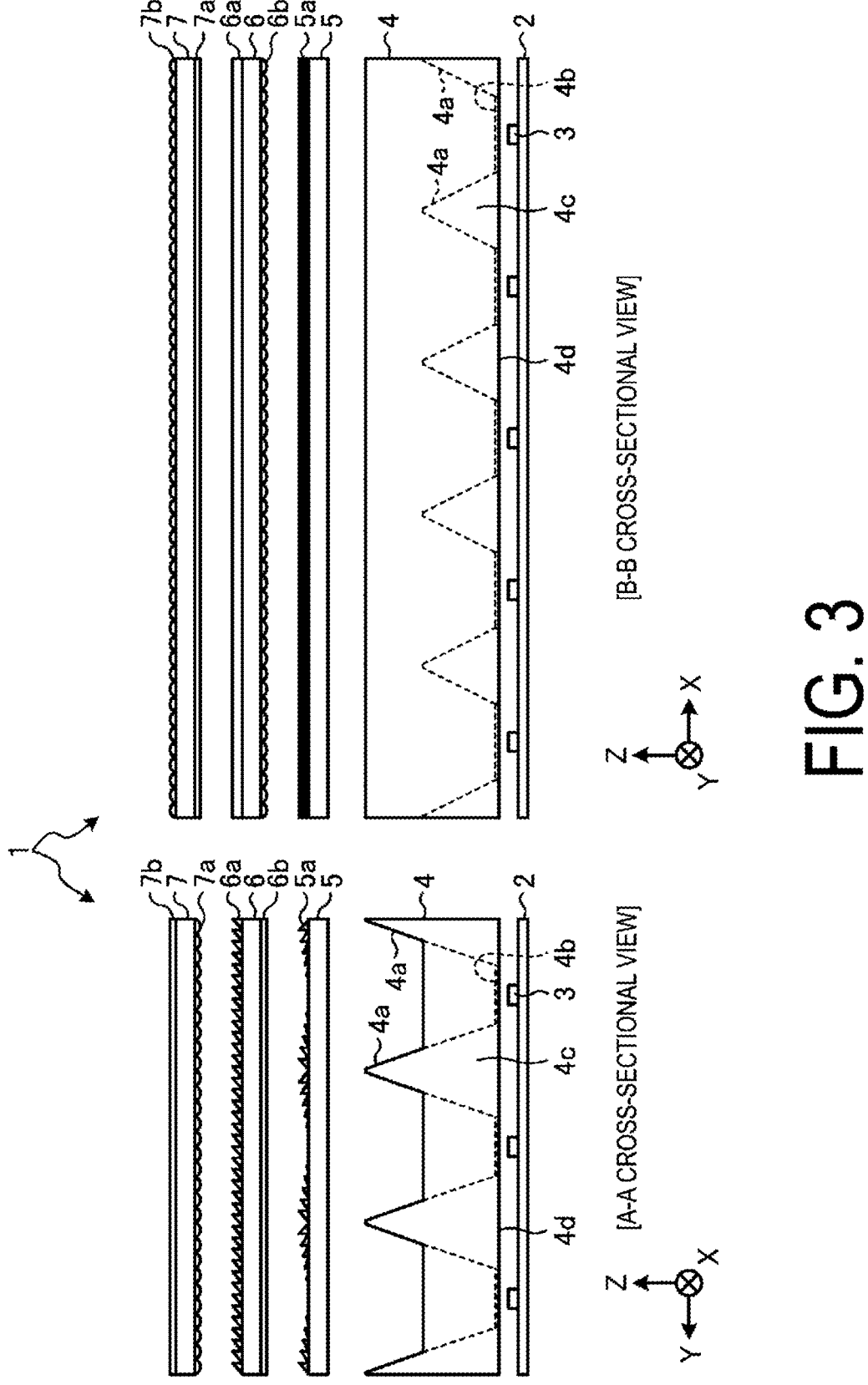
FIG. 3 is an A-A cross-sectional view and a B-B cross-sectional view of the planar illumination device illustrated in FIG. 1.

FIG. 2 is a perspective view schematically illustrating a configuration of the planar illumination device 1 illustrated in FIG. 1. FIG. 3 is an A-A cross-sectional view and a B-B cross-sectional view of the planar illumination device 1 illustrated in FIG. 1. Further, in FIG. 2 and FIG. 3, illustration of the frame 9 is omitted.

In FIGS. 2 and 3, the planar illumination device 1 includes a substrate 2, light sources 3, a reflector 4, a condenser lens 5, a light distribution lens 6, and a visual field range adjustment lens 7. A plurality of light sources 3 such as light emitting diodes (LEDs) are arranged in a two-dimensional lattice shape on the substantially rectangular substrate 2. Each of the plurality of light sources 3 is individually driven, and can cope with so-called local dimming.

The reflector 4 is arranged at the emission side of the plurality of light sources 3. A structure of the reflector 4 will be described below.

The condenser lens 5 is arranged at the emission side of the reflector 4 and the plurality of light sources 3. The condenser lens 5 extends in the X-axis direction, and includes, as a first optical element, a linear Fresnel lens 5a condensing light emitted from the plurality of light sources 3 in the Y-axis direction. The linear Fresnel lens 5a is provided at the surface opposite to the surface opposing the substrate 2 (the emission surface of the condenser lens 5). The linear Fresnel lens 5a has a prismatic structure with cylindrical convex lenses being used as a Fresnel lens, and has concave and convex grooves extending in the X-axis direction. In the linear Fresnel lens 5a, the grooves are periodically formed in accordance with the pitch (the pitch in the Y-axis direction) of the light sources 3 arranged directly below.

The light distribution lens 6 is arranged at the emission side of the condenser lens 5. The light distribution lens 6 has a linear prism 6a extending in the X-axis direction as a second optical element for tilting the light distribution of the light condensed by the condenser lens 5 with respect to the Y-axis direction. The linear prism 6a is provided at the surface opposite to the surface opposing the condenser lens 5 (the emission surface of the light distribution lens 6). The linear prism 6a has a substantially triangular prismatic structure extending in the X-axis direction, and the prisms are continuously arranged in the Y-axis direction. Thus, concave and convex grooves extending in the X-axis direction are formed at the emission surface of the light distribution lens 6. The cross-sectional shape of the Y-Z plane of the linear prism 6a is a triangle, and the base angle of the side connecting the point on the positive direction side of the Y-axis of the base and the vertex is smaller than the base angle of the side connecting the point on the negative direction side of the Y-axis of the base and the vertex. The Y-axis direction is an example of a first axial direction. The X-axis direction is an example of a second axial direction.

In addition, the light distribution lens 6 includes a lenticular lens 6b extending in the Y-axis direction as a fourth optical element for spreading light emitted from the plurality of light sources 3 in the X-axis direction. The lenticular lens 6b is provided at the surface opposing the condenser lens 5 (the incidence surface of the light distribution lens 6). The lenticular lens 6b has a dome-shaped fine semi-cylindrical prismatic structure extending in the Y-axis direction. The degree of diffusion of light by the lenticular lens 6b is adjusted by a contact angle of the fine semi-cylindrical prismatic structure.

A visual field range adjustment lens 7 is arranged at the emission side of the light distribution lens 6. The visual field range adjustment lens 7 includes a lenticular lens 7a extending in the X-axis direction as a third optical element for spreading light tilted by the linear prism 6a serving as the second optical element in the Y-axis direction. The lenticular lens 7a is provided on a surface (incidence surface) opposing the light distribution lens 6. The lenticular lens 7a has a dome-shaped fine semi-cylindrical prismatic structure extending in the X-axis direction. The degree of diffusion of light by the lenticular lens 7a is adjusted by a contact angle of the fine semi-cylindrical prismatic structure. When the required visual field range is narrow, the contact angle is set to be small.

In addition, the visual field range adjustment lens 7 has a lenticular lens 7b extending in the Y-axis direction as a fifth optical element paired with the lenticular lens 6b serving as the fourth optical element. The lenticular lens 7b is provided on the surface opposite to the surface opposing the light distribution lens 6 (emission surface of the visual field range adjustment lens 7). The lenticular lens 7b has a dome-shaped fine semi-cylindrical prismatic structure extending in the Y-axis direction. The degree of diffusion of light by the lenticular lens 7b is adjusted by a contact angle of the fine semi-cylindrical prismatic structure. When the required visual field range is narrow, the contact angle is set to be large.

In the embodiment, only the uniaxial linear Fresnel lens 5a extending in the lengthwise direction (X-axis direction) of the substrate 2 is employed in order to condense light only in the widthwise direction (Y-axis direction) of the substrate 2. As a result, in the embodiment, the lens misalignment in the long-side direction can be ignored. Further, although the lenticular lenses are provided in both the X-axis direction and the Y-axis direction in the visual field range adjustment lens 7 in the embodiment, since the lenticular lenses have the same shape pattern, it is not necessary to take the lens misalignment into account.

Further, although not illustrated in FIG. 3, an optical sheet such as a diffusion sheet or a polarization reflection sheet may be further arranged outside the visual field range adjustment lens 7.

Figure 4:
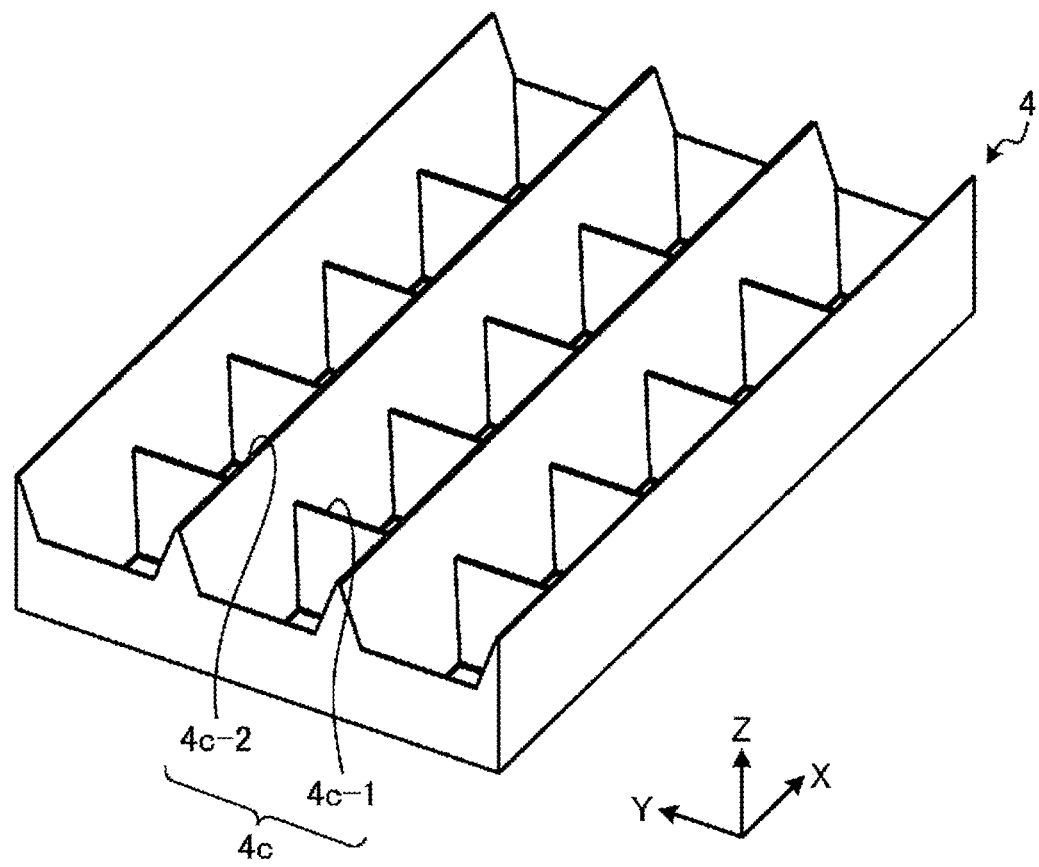
FIG. 4 is a perspective view of a reflector illustrated in FIGS. 2 and 3.
Figure 5:
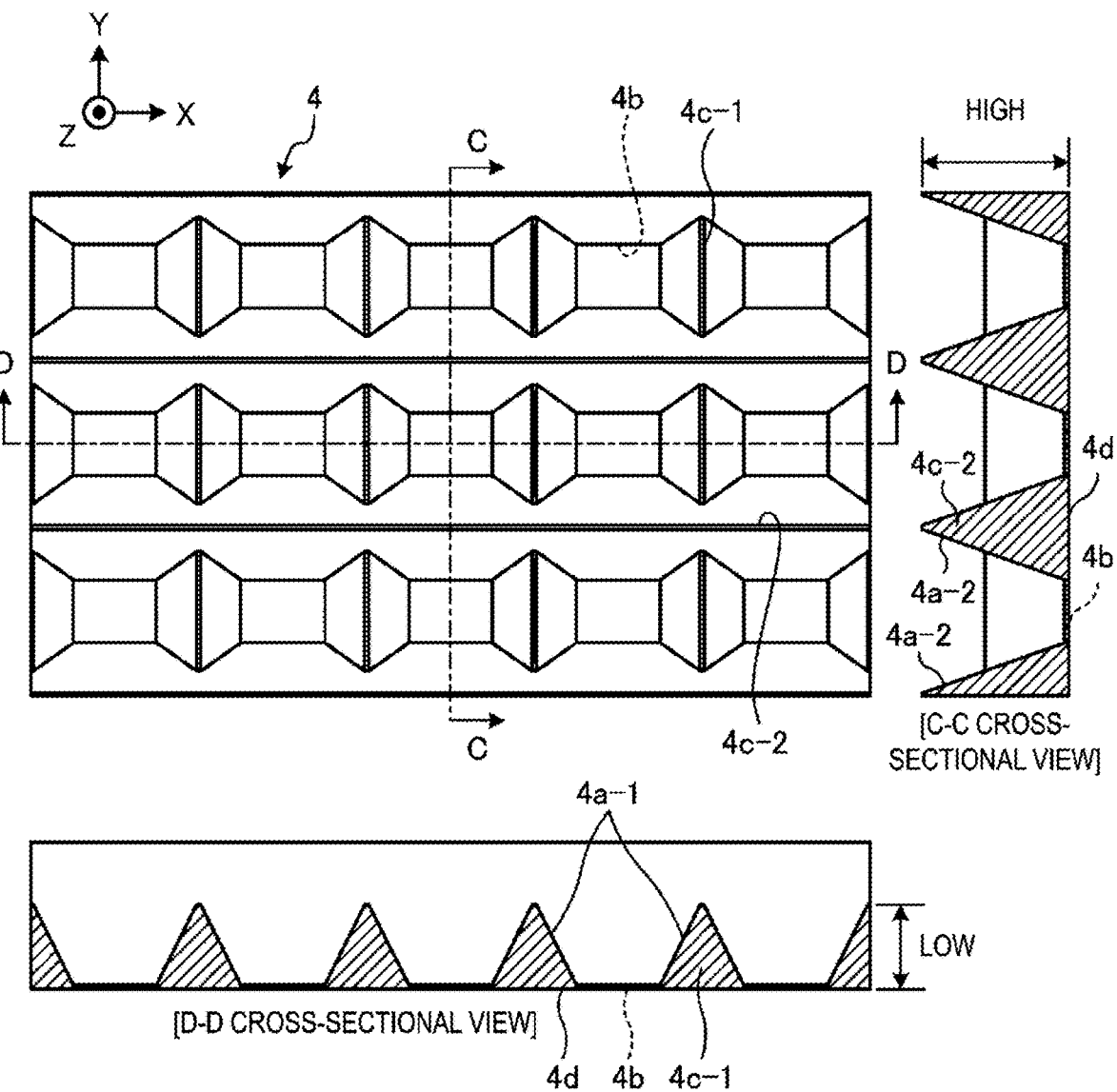
FIG. 5 is a front view, a C-C cross-sectional view, and a D-D cross-sectional view of the reflector.

FIG. 4 is a perspective view of the reflector 4 illustrated in FIGS. 2 and 3. FIG. 5 is a front view, a C-C cross-sectional view, and a D-D cross-sectional view of the reflector 4.

In FIGS. 4 and 5, a wall part 4c of the reflector 4 has a shape such that a plurality of first wall parts 4c-1 extending in the Y-axis direction and a plurality of second wall parts 4c-2 extending in the X-axis direction are assembled in a lattice shape. Further, the wall part 4c is assembled such that the bottom surface of the first wall parts 4c-1 and the bottom surface of the second wall parts 4c-2 are flush with each other.

Reflecting surfaces 4a are wall surfaces of the wall part 4c. The two reflecting surfaces 4a-1 opposing each other between the two first wall parts 4c-1 adjacent to each other in the X-axis direction are tilted to be away from each other toward the Z-axis positive direction. In addition, two reflecting surfaces 4a-2 opposing each other between two second wall parts 4c-2 adjacent to each other in the Y-axis direction are tilted to be away from each other toward the Z-axis positive direction. The reflector 4 is formed from, for example, a white resin or the like in order to enhance the reflection effect. The reflector 4 of the embodiment is a molded article formed through injection molding.

The height of the first wall parts 4c-1 is defined by the visual field range in the X-axis direction, and the height of the second wall parts 4c-2 is defined by the visual field range in the Y-axis direction. In the embodiment, since narrow visual field characteristics are required in the Y-axis direction, the height of the second wall parts 4c-2 is increased as illustrated in the C-C cross-sectional view of FIG. 5. By increasing the height of the second wall parts 4c-2, the widely distributed light components from the light sources 3 can be reflected by the reflecting surfaces 4a-2 and condensed at the linear Fresnel lens 5a of the segment corresponding to the individual light sources 3.

In addition, increasing the height of the second wall parts 4c-2 also plays a role of blocking light entering the linear Fresnel lens 5a of the adjacent segment, and has a function of avoiding the occurrence of an unintended light distribution.

On the other hand, in the embodiment, since wide visual field characteristics are required in the X-axis direction, the wide light distribution components from the light sources 3 are used without being blocked by reducing the height of the first wall parts 4c-1 as illustrated in the D-D cross-sectional view of FIG. 5. In the embodiment, the height of the second wall parts 4c-2 extending in the X-axis direction (lengthwise direction) is greater than the height of the first wall parts 4c-1 extending in the Y-axis direction (widthwise direction).

In addition, the reflector 4 of the embodiment is arranged such that the openings 4b on the light sources 3 side are located at the emission side of the light-emitting surfaces of the light sources 3 as illustrated in FIG. 3. The light-emitting surfaces of the light sources 3 correspond to the top surfaces of the light sources 3. In other words, a bottom surface 4d of the wall parts 4c of the reflector 4 are arranged in a state of being raised above the substrate 2 to be located at a position higher than the light-emitting surface of the light sources 3 as illustrated in FIG. 3.

When the reflector 4 is grounded on the substrate 2, the wall parts 4*c* of the reflector 4 and the light sources 3 are close to each other, and the reflector 4 and the light sources 3 are likely to interfere with each other when the reflector 4 and the light sources 3 expand and contract. On the other hand, in the embodiment, since the openings 4*b* of the reflector 4 are arranged at positions higher than the light-emitting surfaces of the light sources 3, even if the reflector 4 and the light source 3 expand and contract, there is no possibility of the wall parts 4*c* of the reflector 4 and the light sources 3 coming into contact with each other.

Since the intervals between the light sources 3 are narrow, when the bottom surface 4*d* of the reflector 4 is to be arranged over the substrate 2, the size of the bottom surface 4*d* cannot be increased, and thus it is difficult to increase the height of the wall parts 4*c* of the reflector 4 from the viewpoint of moldability of injection molding. On the other hand, in the embodiment, the size of each opening 4*b* of the reflector 4 can be made smaller than the outer circumference of each light source 3 as long as the opening 4*b* is larger than the light-emitting surface of the light source 3 in a top view. That is, in the embodiment, the size of each opening 4*b* can be set to be smaller. In other words, in the embodiment, the size of the bottom surface 4*d* can be increased, and as a result, the heights of the wall parts 4*c* of the reflector 4 formed by injection molding can be increased. For this reason, in the embodiment, it is possible to obtain effects of high contrast at the time of local dimming and removal of unnecessary light distributions.

Figure 6:
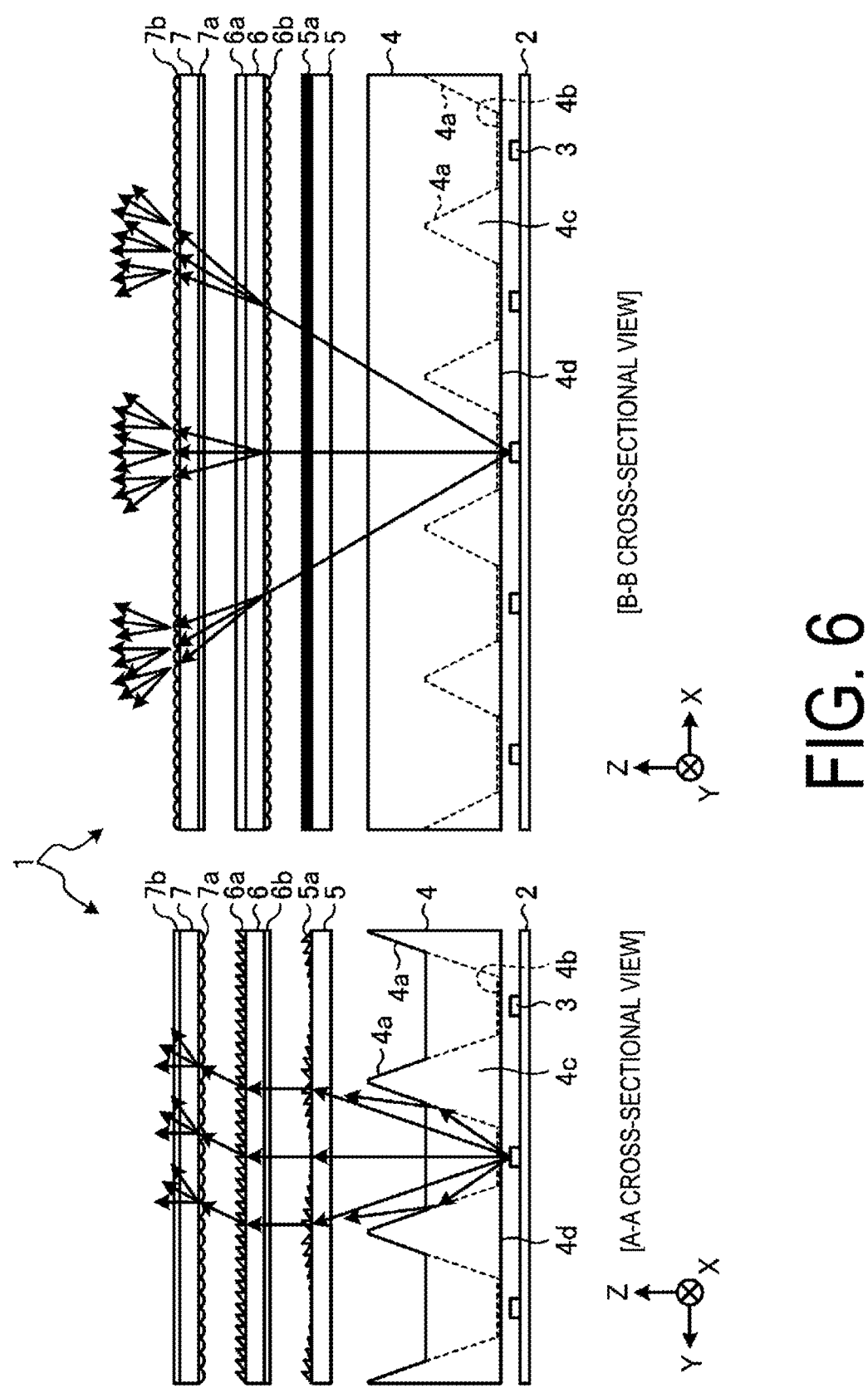
FIG. 6 is a view illustrating the behavior of light in the A-A cross-sectional view and the B-B cross-sectional view of FIG. 3.

FIG. 6 is a view illustrating the behavior of light in the A-A cross-sectional view and the B-B cross-sectional view of FIG. 3. In the A-A cross-sectional view of FIG. 6, light emitted from the light source 3 enters the condenser lens 5, is refracted by the linear Fresnel lens 5*a* provided on the emission surface of the condenser lens 5, and is emitted as substantially parallel light. Then, the substantially parallel light emitted from the condenser lens 5 enters the light distribution lens 6, and is emitted with the optical axis being tilted by the linear prism 6*a* provided on the emission surface of the light distribution lens 6. Since the lenticular lens 6*b* provided on the incidence surface of the light distribution lens 6 does not act in the Y-axis direction, it does not affect the light condensation by the linear Fresnel lens 5*a* and the peak shift by the linear prism 6*a*.

The light emitted from the light distribution lens 6 is incident on the visual field range adjustment lens 7, and is spread by the lenticular lens 7*a* provided on the incidence surface of the visual field range adjustment lens 7, and thus the required visual field range in the Y-axis direction is secured. Further, since the lenticular lens 7*b* provided on the emission surface of the visual field range adjustment lens 7 does not act in the Y-axis direction, the action of the lenticular lens 7*a* to spread light is not affected. When the light emitted from the light distribution lens 6 already satisfies the required visual field range, it is not necessary to provide the lenticular lens 7*a*.

On the other hand, in the B-B cross-sectional view of FIG. 6, the light emitted from the light source 3 enters the condenser lens 5, and is emitted without being refracted by the linear Fresnel lens 5*a* provided on the emission surface of the condenser lens 5. This is because the linear Fresnel lens 5*a* does not act in the X-axis direction.

The light emitted from the condenser lens 5 enters the light distribution lens 6, and is spread by the lenticular lens 6*b* provided on the incidence surface of the light distribution lens 6. The linear prism 6*a* provided on the emission surface of the light distribution lens 6 does not act in the X-axis direction.

The light emitted from the light distribution lens 6 is incident on the visual field range adjustment lens 7, and is spread by the lenticular lens 7*b* provided on the emission surface of the visual field range adjustment lens 7. The lenticular lens 7*a* provided on the incidence surface of the visual field range adjustment lens 7 does not act in the X-axis direction.

As described above, a wide light distribution is obtained as a whole as the behavior of the light emitted from the light sources 3 in the X-axis direction, the light is further spread in two stages by the pair of lenticular lenses 6*b* and 7*b*, and thus the light is mixed and luminance unevenness and chromaticity unevenness caused by the pitch of the light sources 3 are alleviated. In the embodiment, the contact angle of the lenticular lens 7*b* is set to be larger than the contact angle of the lenticular lens 6*b*, thereby improving the efficiency.

Figure 7:
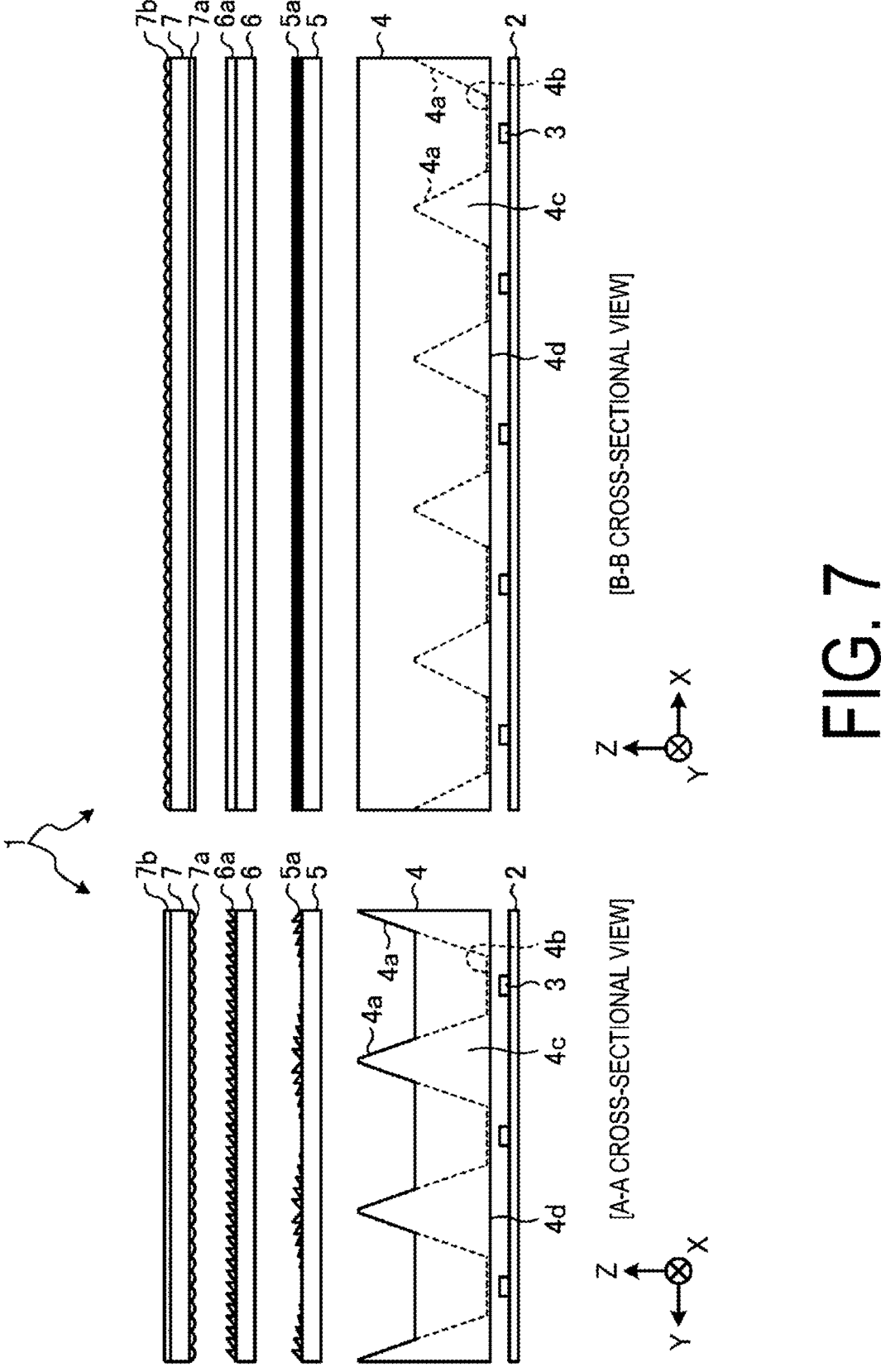
FIG. 7 is a view illustrating a lens configuration example of a comparative example.

FIG. 7 is a view illustrating a lens configuration example of a comparative example. In FIG. 7, the drawing on the left side corresponds to the A-A cross-sectional view on the left side of FIGS. 3 and 6, and the drawing on the right side corresponds to the B-B cross-sectional view on the right side of FIGS. 3 and 6. In the planar illumination device 1 of the comparative example illustrated in FIG. 7, no lenticular lens 6*b* is provided on the incidence surface of the light distribution lens 6, and other configurations are the same as the configurations illustrated in FIGS. 3 and 6.

Figure 8:
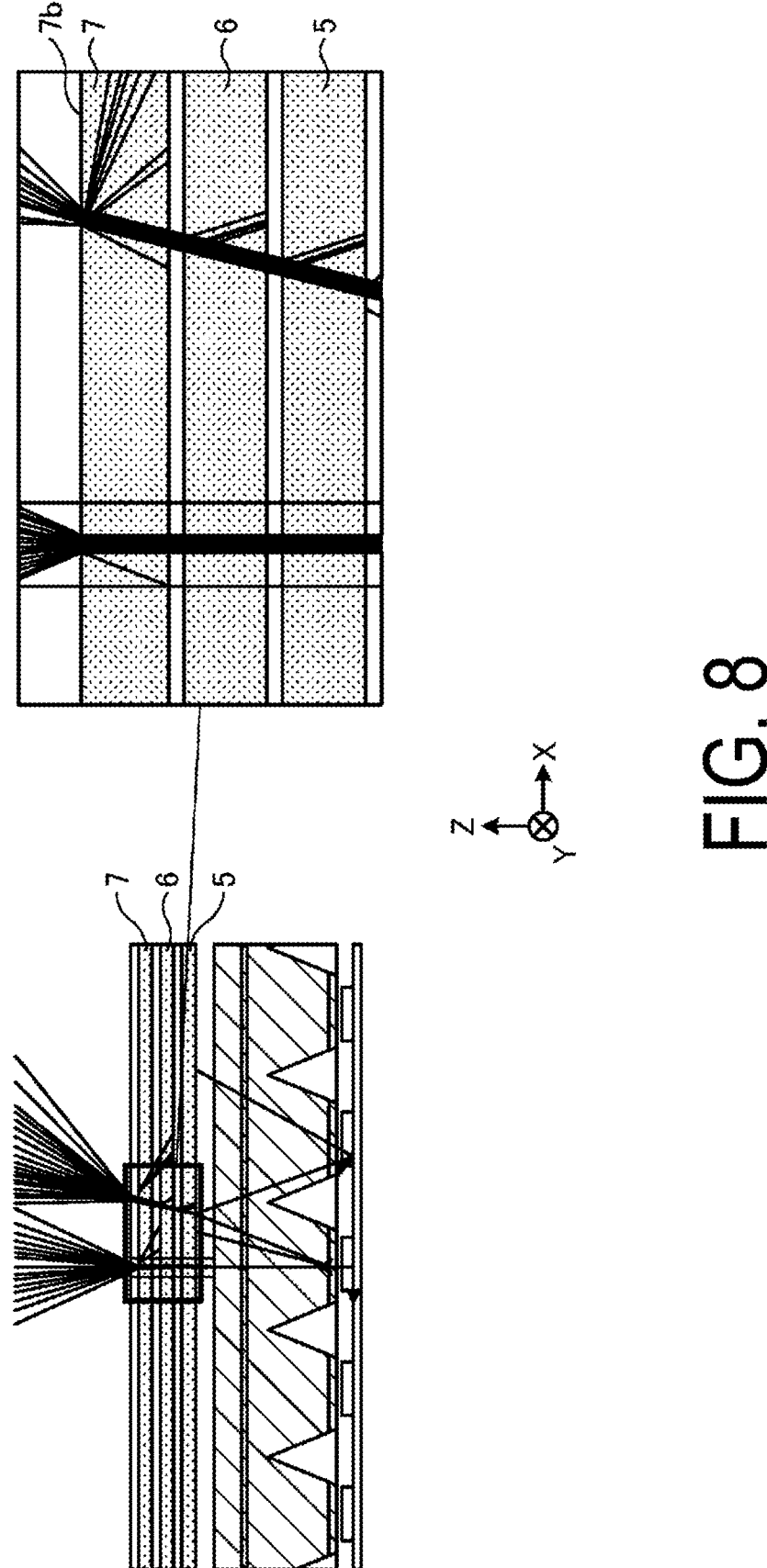
FIG. 8 is a view of the behavior of light in the comparative example of FIG. 7 and an enlarged view thereof.
Figure 9:
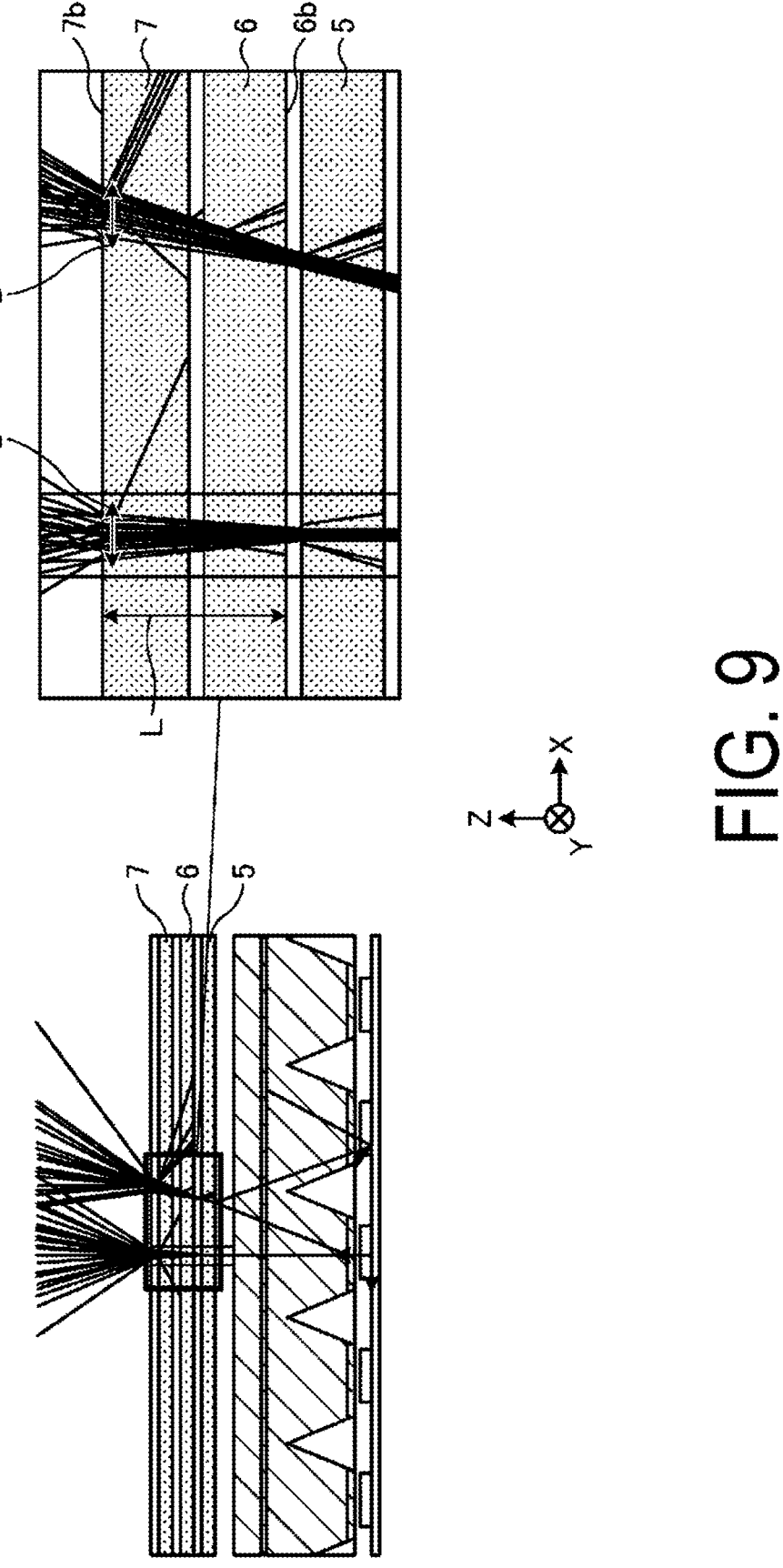
FIG. 9 is a view of the behavior of light in the first embodiment and an enlarged view thereof.

FIG. 8 is a view of the behavior of light in the comparative example of FIG. 7 and an enlarged view of the light. FIG. 9 is a view of the behavior of light in the first embodiment and an enlarged view of the light. The behavior of light in the X-axis direction in the comparative example of FIG. 8 is only the spread of light by the lenticular lens 7*b* on the emission surface of the visual field range adjustment lens 7. On the other hand, the behavior of light in the X-axis direction in the first embodiment illustrated in FIG. 9 has two stages, i.e., the spread of light by the lenticular lens 6*b* on the incidence surface of the light distribution lens 6 and the spread of light by the lenticular lens 7*b* on the emission surface of the visual field range adjustment lens 7. Therefore, streaky luminance unevenness caused by the pitch of the light sources 3 is reduced, and the uniformity of the light-emitting surface is improved.

In addition, light emitted from a light source such as an LED generally has a phenomenon of color changing between a central portion and a peripheral portion of the light source, and particularly when a condensing lens or the like is used, chromaticity unevenness tends to become conspicuous. In a case of a backlight, luminance unevenness and chromaticity unevenness are often evaluated on a light-emitting surface (the emission surface of the visual field range adjustment lens 7 or the emission surface of an optical sheet when the optical sheet is further provided outside the visual field range adjustment lens 7). In the first embodiment illustrated in FIG. 9, by using a pair of lenticular lenses (double lenticular lenses), the distance L of the spread of light from the incidence surface of the light distribution lens 6 to the emission surface of the visual field range adjustment lens 7 is increased, and the width D allowing light being mixed on the light-emitting surface is increased, and thus chromaticity unevenness can be reduced.

Figure 10:
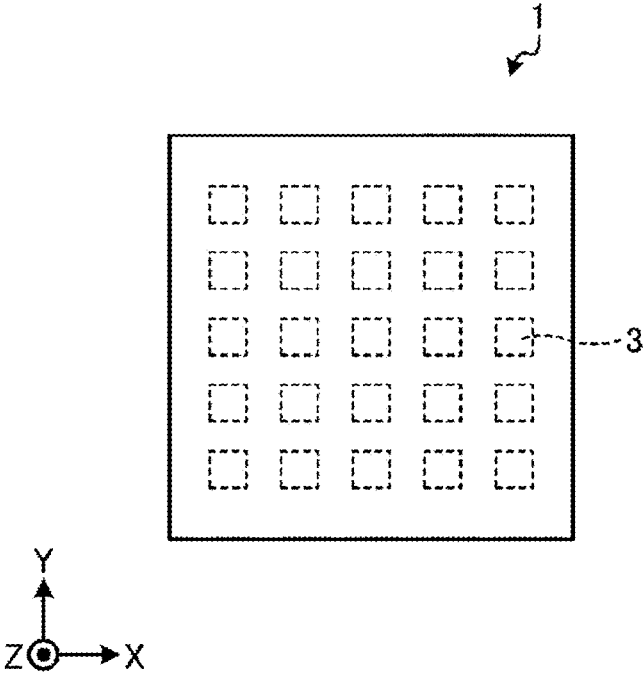
FIG. 10 is a plan view of a planar illumination device with a 5×5 array of light sources for simulation.
Figure 11:
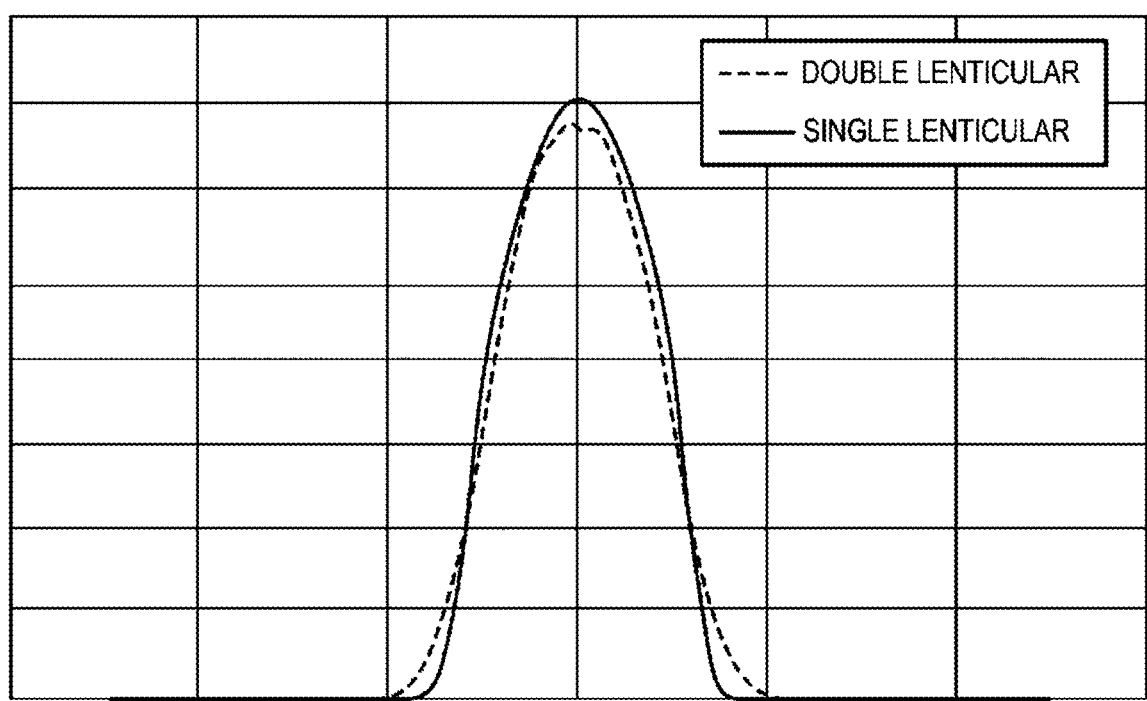
FIG. 11 is a graph showing an example of a luminance cross-sectional profile by single lighting.
Figure 12:
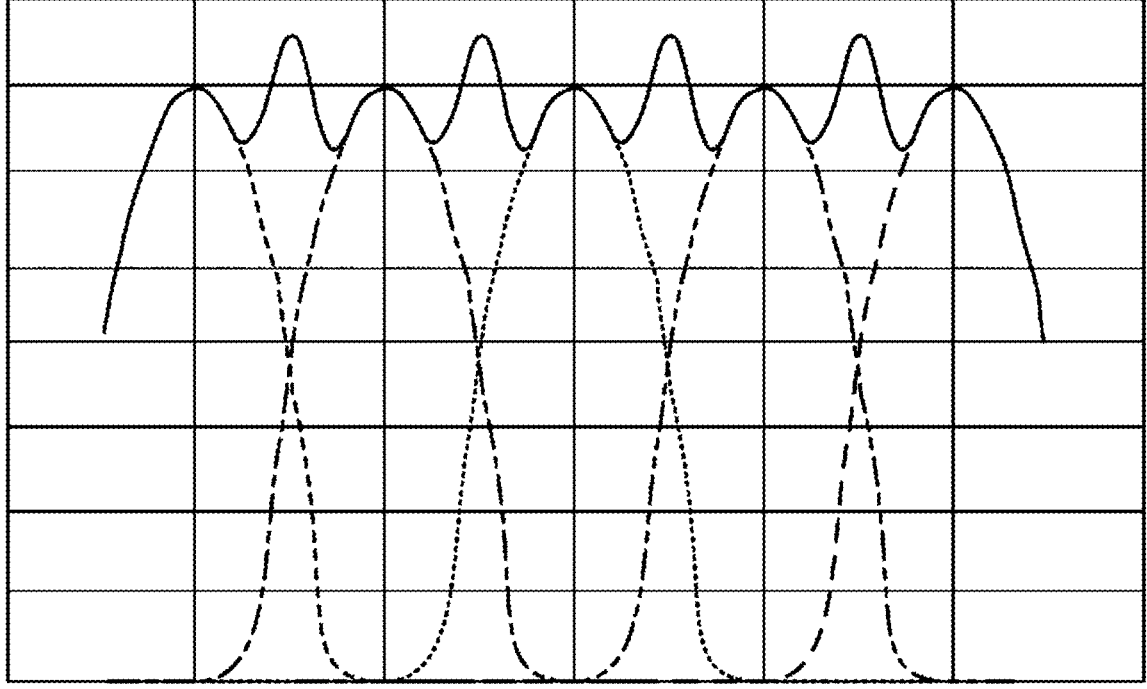
FIG. 12 is a graph showing a luminance cross-sectional profile by full lighting in the comparative example of FIG. 7.
Figure 13:
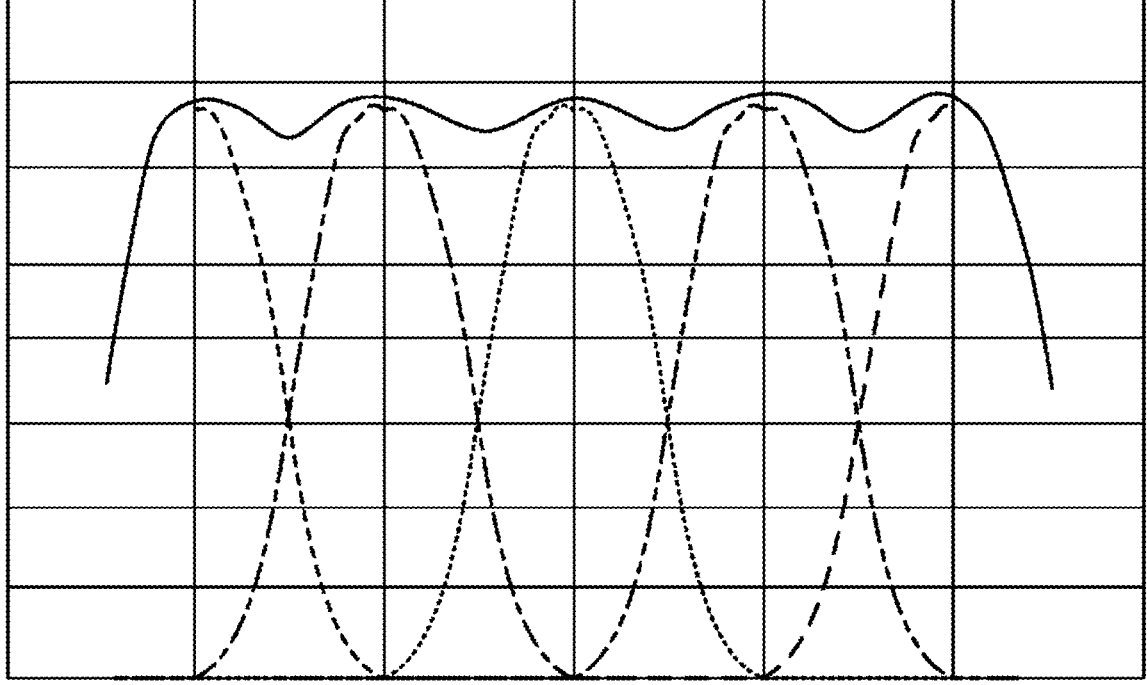
FIG. 13 is a graph showing a luminance cross-sectional profile by full lighting in the first embodiment.

FIG. 10 is a plan view of the planar illumination device 1 with a 5×5 array of light sources 3 for simulation. FIG. 11 is a diagram illustrating an example of a luminance cross-sectional profile by single lighting. The horizontal axis represents the position of the light sources 3 in the X-axis direction, and the vertical axis represents luminance. In addition, the solid line indicates the lens configuration of the single lenticular lens (according to the comparative example), and the broken line indicates the lens configuration of the double lenticular lens (according to the first embodiment). FIG. 12 is a diagram showing a luminance cross-sectional profile by full lighting in the comparative example of FIG. 7, and the luminance cross-sectional profile is a total value when the profile indicated by the solid line in FIG. 11 is arranged by shifting five light sources 3 in the X-axis direction as illustrated in FIG. 10. FIG. 13 is a diagram showing a luminance cross-sectional profile by full lighting in the first embodiment, and the luminance cross-sectional profile is a total value when the profile indicated by the broken line in FIG. 11 is arranged by shifting five light sources 3 in the X-axis direction as illustrated in FIG. 10.

In FIG. 11, while the luminance cross-sectional profile by single lighting of the single lenticular lens is close to a parabola, the double lenticular lenses can have a profile with a lower central portion and an expanded peripheral portion by adjusting the contact angles of the two lenticular lenses. In this regard, since the degree of freedom in adjustment of the profile shape is small with only the single lenticular lens, such adjustment is difficult. Thus, peaks and valleys of the profile when profiles are overlapped are reduced, and the uniformity of the light-emitting surfaces when the plurality of light sources 3 are turned on is improved.

As is clear from a comparison between the comparative example in FIG. 12 and the first embodiment in FIG. 13, while it can be seen that the change in luminance with respect to the position is large and the luminance unevenness is large in the comparative example, it can be seen that the change in luminance with respect to the position is small and the luminance unevenness is small in the first embodiment.

Modification of First Embodiment

In the first embodiment, the pair of fourth optical element (lenticular lens 6b) and fifth optical element (lenticular lens 7b) may be arranged at the emission side of the plurality of light sources 3, and the lens configuration can be changed in various ways. For example, the lenticular lens 6b in FIG. 3 may be arranged at the incidence surface of the condenser lens 5. Further, from the viewpoint of efficiency in light condensing by the linear Fresnel lens 5a of the condenser lens 5, it is preferable that the lenticular lens 6b be arranged at the latter stage of the linear Fresnel lens 5a as illustrated in FIG. 3. Furthermore, although the linear Fresnel lens 5a is preferably provided on the emission surface of the condenser lens 5 as illustrated in FIG. 3 from the viewpoint of efficiency in light condensing by the linear Fresnel lens 5a, the linear Fresnel lens 5a may be provided on the incidence surface of the condenser lens 5. In addition, the lens configuration may include a compound prism 10a according to a second embodiment to be described below.

Second Embodiment

In the planar illumination device 1 of the first embodiment illustrated in FIG. 3 described above, a total of three lenses (5, 6, and 7) are required as measures for light condensing, peak shift, and luminance unevenness and chromaticity unevenness and reducing the number of lenses is desired from the viewpoint of reducing the number of components and cost. In the second embodiment, the same functions can be realized with a smaller number of lenses. The outer shape of a planar illumination device 1 according to the second embodiment is the same as the outer shape of the planar illumination device illustrated in FIG. 1.

Figure 14:
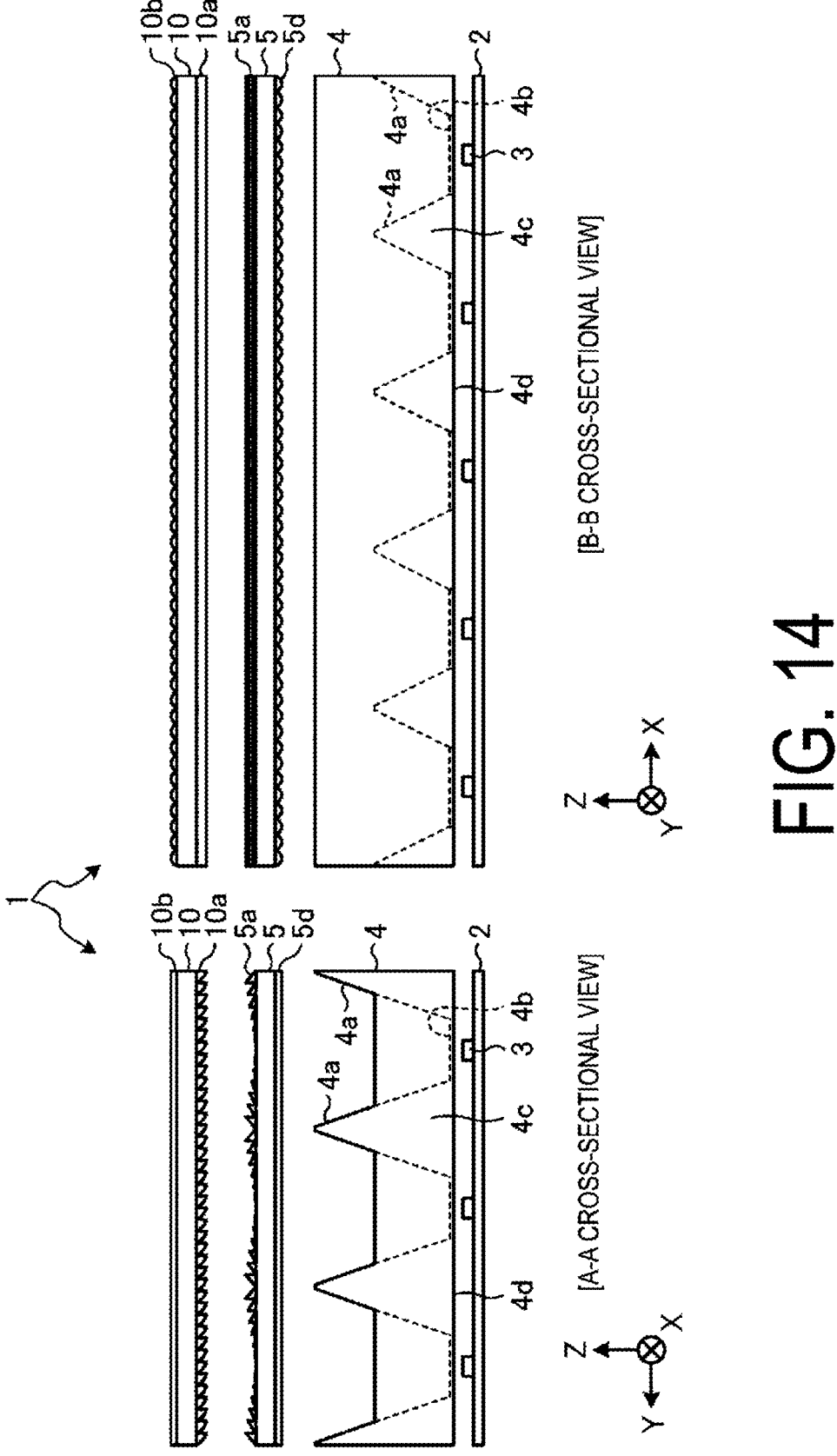
FIG. 14 is a view illustrating a lens configuration example of a planar illumination device according to a second embodiment.

FIG. 14 is a view illustrating a lens configuration example of the planar illumination device 1 according to the second embodiment. In FIG. 14, the planar illumination device 1 includes a substrate 2, light sources 3, a reflector 4, a condenser lens 5, and a light distribution/visual field range adjustment lens 10. The substrate 2, the light sources 3, and the reflector 4 are the same as the substrate, the light sources, and the reflector of the first embodiment.

The condenser lens 5 is arranged at the emission side of the reflector 4 and the plurality of light sources 3. A lenticular lens 5d extending in the Y-axis direction is provided on an incidence surface (a surface opposing the light sources 3 and the reflector 4) of the condenser lens 5 as a fourth optical element for spreading light emitted from the plurality of light sources 3 in the X-axis direction. The lenticular lens 5d corresponds to the lenticular lens 6b in FIG. 3, and has the same structure.

In FIG. 14, a linear Fresnel lens 5a is provided on the emission surface of the condenser lens 5. The linear Fresnel lens 5a corresponds to the linear Fresnel lens 5a in FIG. 3, and has the same structure.

In FIG. 14, a light distribution/visual field range adjustment lens 10 is arranged at the emission side of the condenser lens 5. A compound prism 10a having a linear prism (corresponding to the linear prism 6a in FIG. 3) and a lenticular lens (corresponding to the lenticular lens 7a in FIG. 3) combined with each other is provided on the incidence surface of the light distribution/visual field range adjustment lens 10.

A lenticular lens 10b is provided on the emission surface of the light distribution/visual field range adjustment lens 10. The lenticular lens 10b corresponds to the lenticular lens 7b in FIG. 3, and has the same structure.

Further, although not illustrated in FIG. 14, an optical sheet such as a diffusion sheet or a polarization reflection sheet may be further arranged outside the light distribution/visual field range adjustment lens 10. In addition, in FIG. 14, the frame 9 is not illustrated as in FIG. 3.

Figure 15:
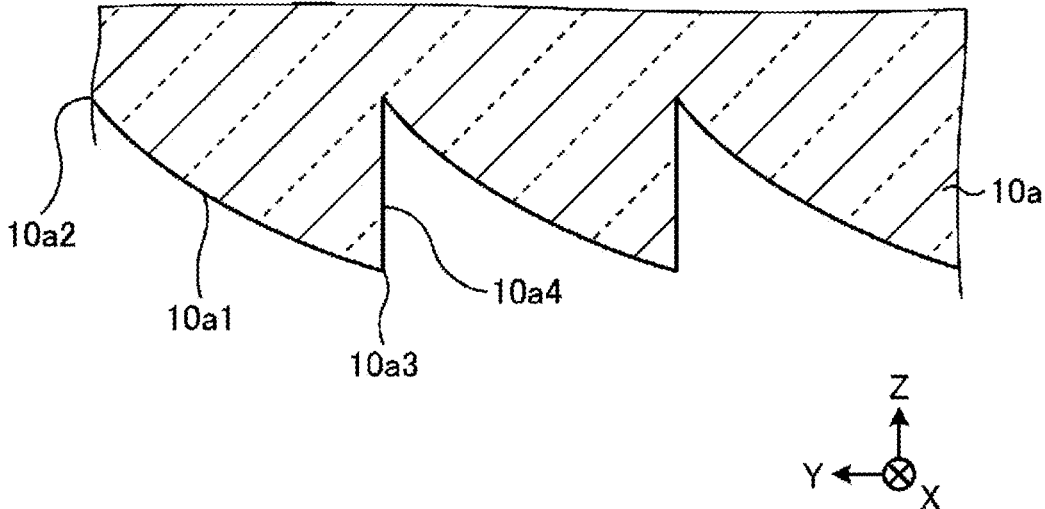
FIG. 15 is an example of a cross section of a compound prism provided on an incidence surface of a light distribution/visual field range adjustment lens.

FIG. 15 is an example of a cross section of the compound prism 10a provided on the incidence surface of the light distribution/visual field range adjustment lens 10. In FIG. 15, the compound prism 10a has an arc part 10a1 being convex toward the lens outward side (downward direction in the drawing or negative Z-axis direction) and a cliff part 10a4 running from a lowermost end point part 10a3 of each arc part 10a1 in the drawing back to the lens inward side. Due to the curvature shape of the arc part 10a1, the function of tilting light and the function of spreading light can be realized simultaneously.

Figure 16:
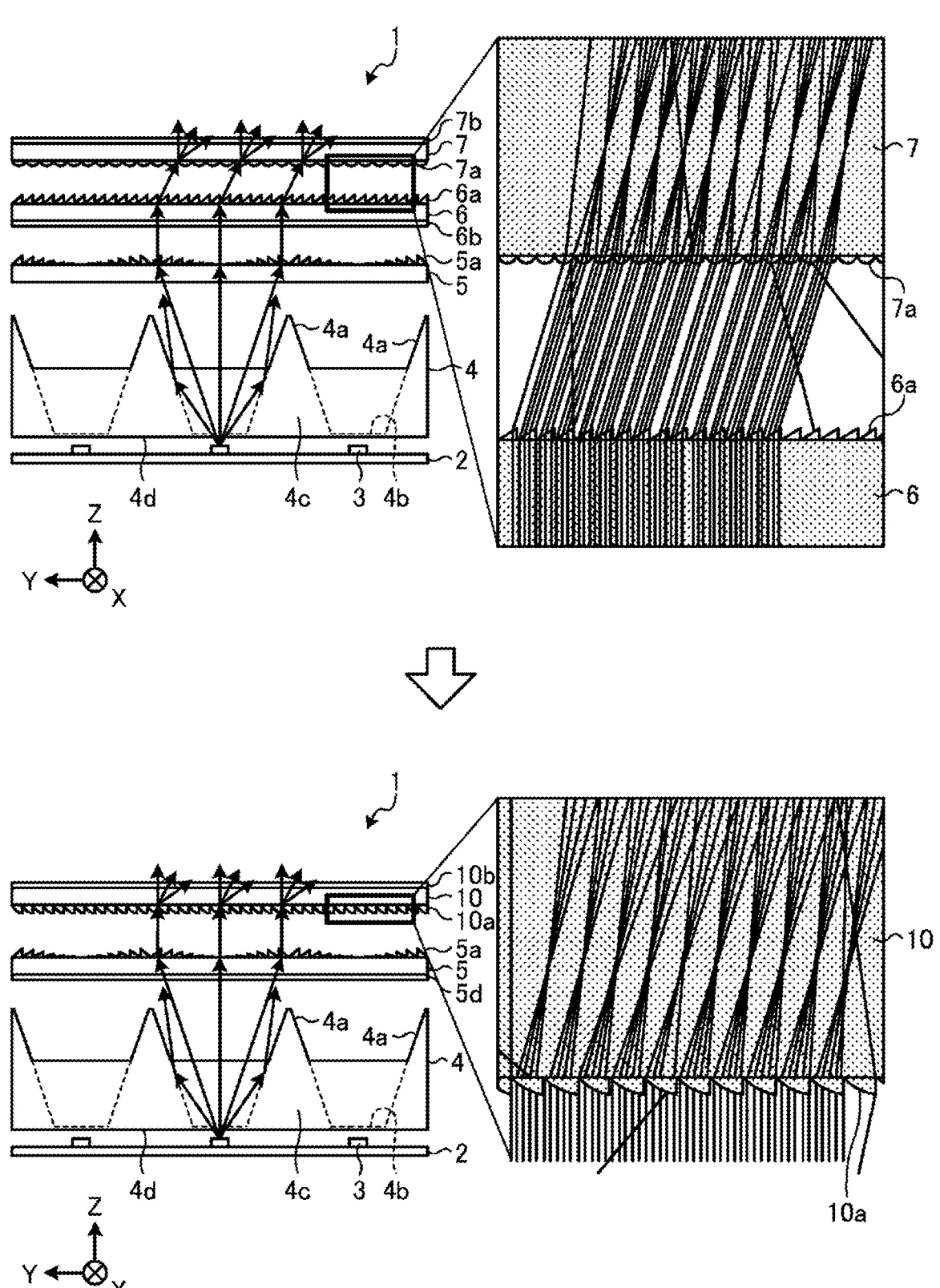
FIG. 16 is a view illustrating an example of behavior of light when no compound prism is used and an example of behavior of light in the second embodiment with use of a compound prism.

FIG. 16 is a view illustrating an example of behavior of light when no compound prism 10a is used and an example of behavior of light in the second embodiment with use of the compound prism 10a. The upper diagram of FIG. 16 illustrates the same configuration as the configuration of FIG. 3 illustrating no compound prism 10a being used. In this case, the optical axis is tilted by the linear prism 6a on the emission surface of the light distribution lens 6, and the light is spread by the lenticular lens 7a on the incidence surface of the visual field range adjustment lens 7.

On the other hand, the lower diagram of FIG. 16 illustrates the configuration of FIG. 14 with the compound prism 10a being used. In this case, the optical axis is tilted and spreads by the compound prism 10a on the incidence surface of the light distribution/visual field range adjustment lens 10. Since two lens functions are realized by one lens surface as described above, the number of lenses can be reduced. That is, although a total of three lenses are used in the upper configuration of FIG. 16, the number can be reduced to a total of two lenses in the lower configuration of FIG. 16.

Modification of Second Embodiment

Figure 17:
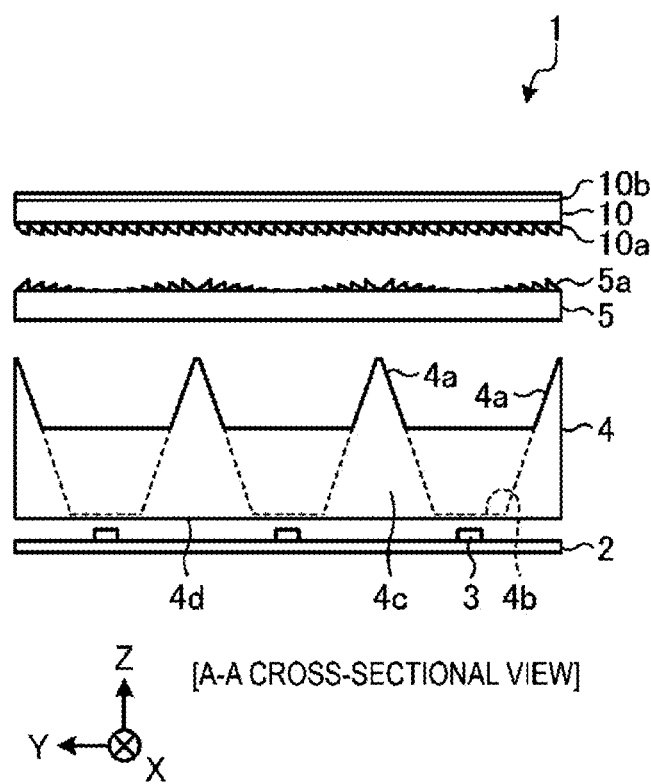
FIG. 17 is a view illustrating a first modification of a lens configuration including the compound prism.

FIG. 17 is a view illustrating a first modification of the lens configuration including the compound prism 10*a*. The planar illumination device 1 illustrated in FIG. 17 is obtained by removing the lenticular lens 5*d* on the incidence surface of the condenser lens 5 from the planar illumination device 1 illustrated in FIG. 14. This configuration can be adopted when the luminance unevenness and the chromaticity unevenness in the X-axis direction in the first embodiment do not need to be reduced. The other configurations are the same as the configurations in FIG. 14.

Figure 18:
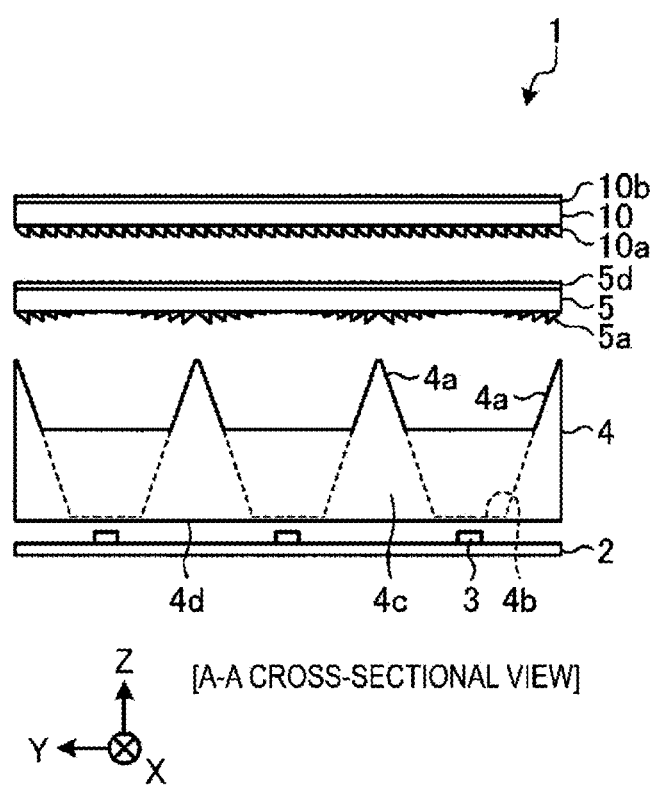
FIG. 18 is a view illustrating a second modification of the lens configuration including the compound prism.

FIG. 18 is a view illustrating a second modification of the lens configuration including the compound prism 10*a*. In the planar illumination device 1 of FIG. 18, the front and back sides of the condenser lens 5 in the planar illumination device 1 of FIG. 14 are reversed, and a linear Fresnel lens 5*a* is provided on the incidence surface and a lenticular lens 5*d* is provided on the emission surface. Although improvement in the light condensing characteristic is expected due to light from the light sources 3 entering the linear Fresnel lens 5*a* first, since the light is directly incident on the cliff part of the linear Fresnel lens 5*a*, there is concern that the light condensing characteristic may deteriorate from that point. The other configurations are the same as the configurations in FIG. 14.

Figure 19:
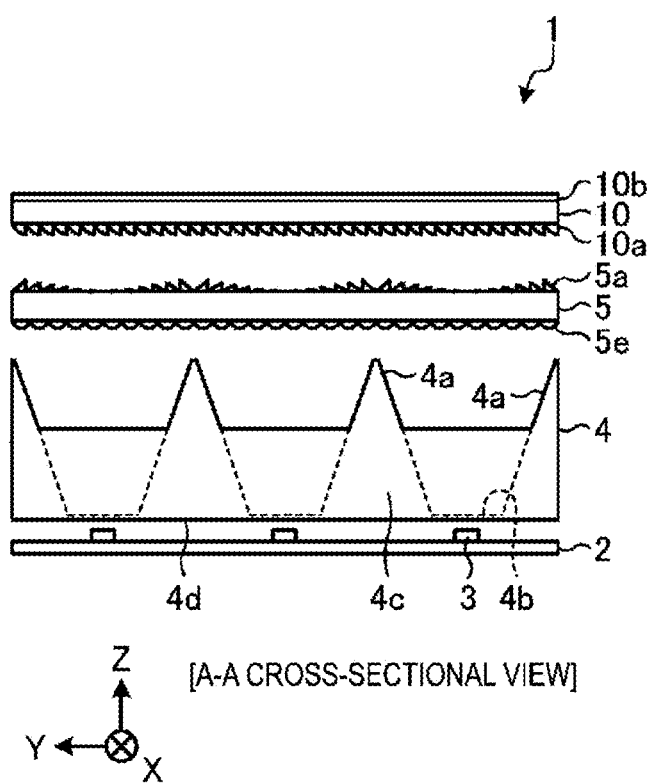
FIG. 19 is a view illustrating a third modification of the lens configuration including the compound prism.

FIG. 19 is a view illustrating a third modification of the lens configuration including the compound prism 10*a*. The planar illumination device 1 of FIG. 19 includes a lenticular lens 5*e* acting in the Y-axis direction is provided on the incidence surface of the condenser lens 5 in the planar illumination device 1 of FIG. 17. This configuration can be adopted when it is desired to expand the visual field range in the Y-axis direction. The other configurations are the same as the configurations in FIG. 17.

Figure 20:
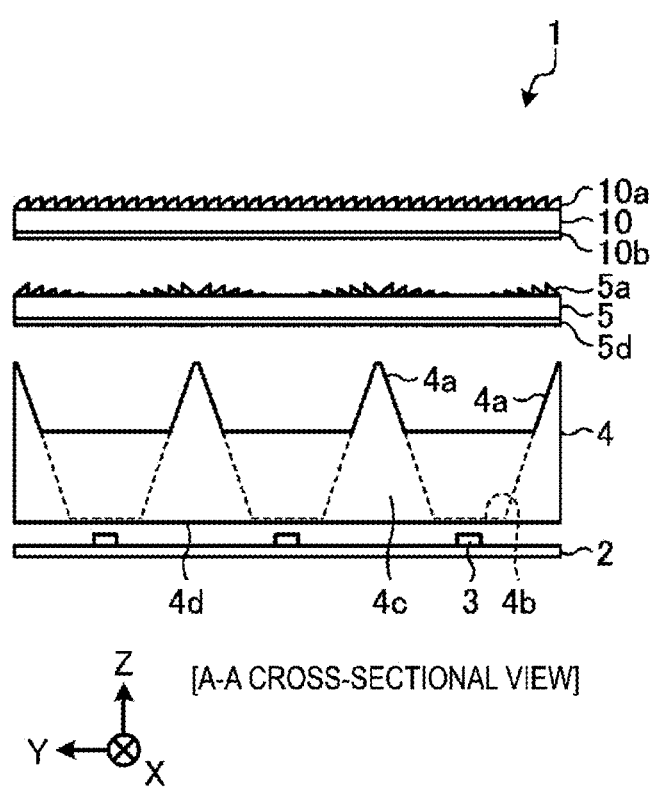
FIG. 20 is a view illustrating a fourth modification of the lens configuration including the compound prism.

FIG. 20 is a view illustrating a fourth modification of the lens configuration including the compound prism 10*a*. In the planar illumination device 1 of FIG. 20, the front and back sides of the light distribution/visual field range adjustment lens 10 in the planar illumination device 1 of FIG. 14 are reversed, the lenticular lens 10*b* is provided on the incidence surface, and the compound prism 10*a* is provided on the emission surface. The other configurations are the same as the configurations in FIG. 14.

Further, although the compound prism 10*a* can adjust the degree of diffusion of light by changing the curvature shape of the arc part 10*a*1, the compound prism may have a linear shape connecting a start point part 10*a*2 and the end point part 10*a*3 when the function of spreading light is not required.

Modifications of Reflector and Condenser Lens

Figure 21:
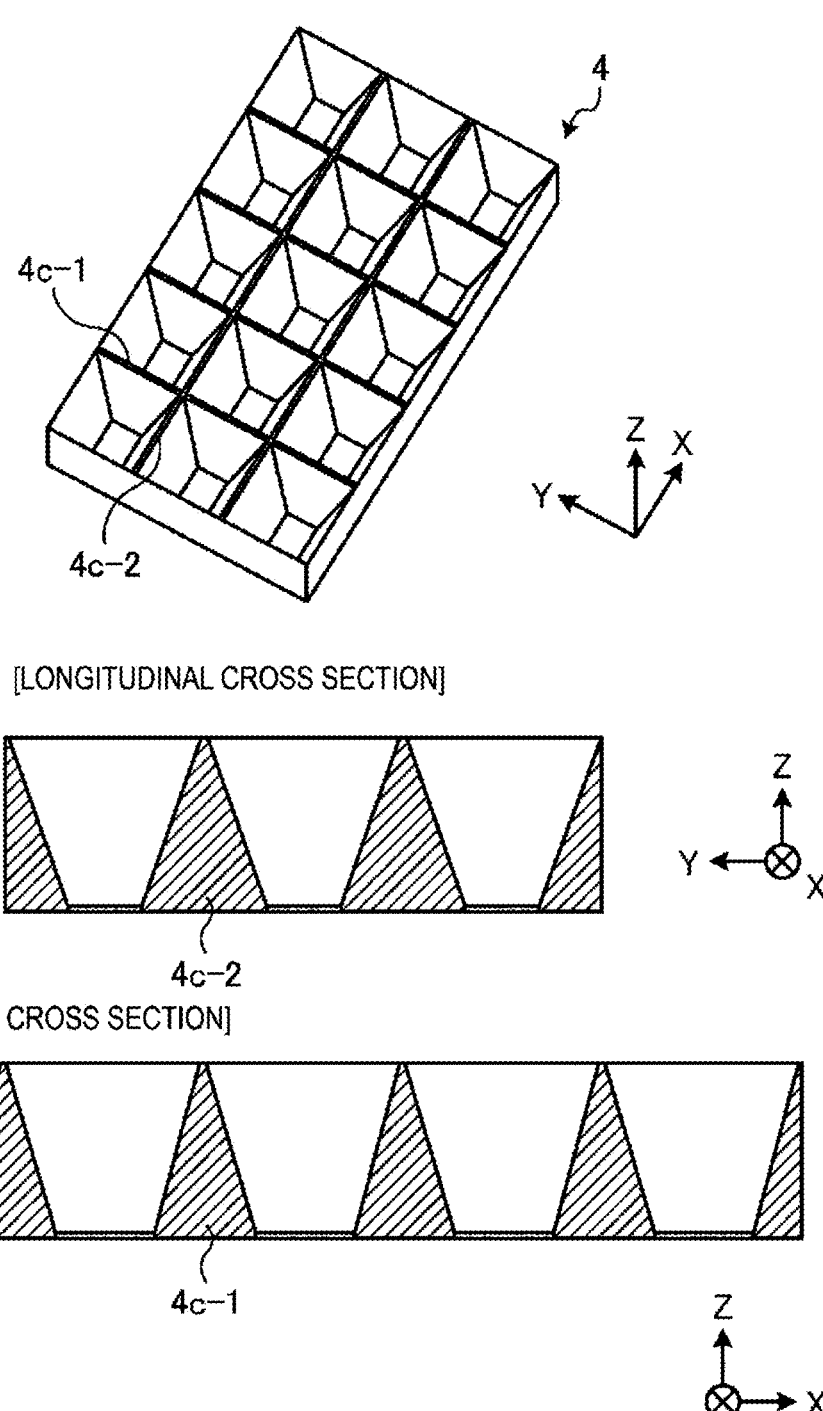
FIG. 21 is a view illustrating a first modification of the reflector.

FIG. 21 is a view illustrating a first modification of the reflector 4. As described above, the height of the first wall parts 4*c*-1 of the reflector 4 is adjusted in accordance with the visual field range in the X-axis direction, and the height of the second wall parts 4*c*-2 is adjusted in accordance with the visual field range in the Y-axis direction. Since the Y-axis direction and the X-axis direction have the visual field ranges at the same degree in the first modification of the reflector 4 illustrated in FIG. 21, the height of the first wall parts 4*c*-1 and the height of the second wall parts 4*c*-2 are the same.

Figure 22:
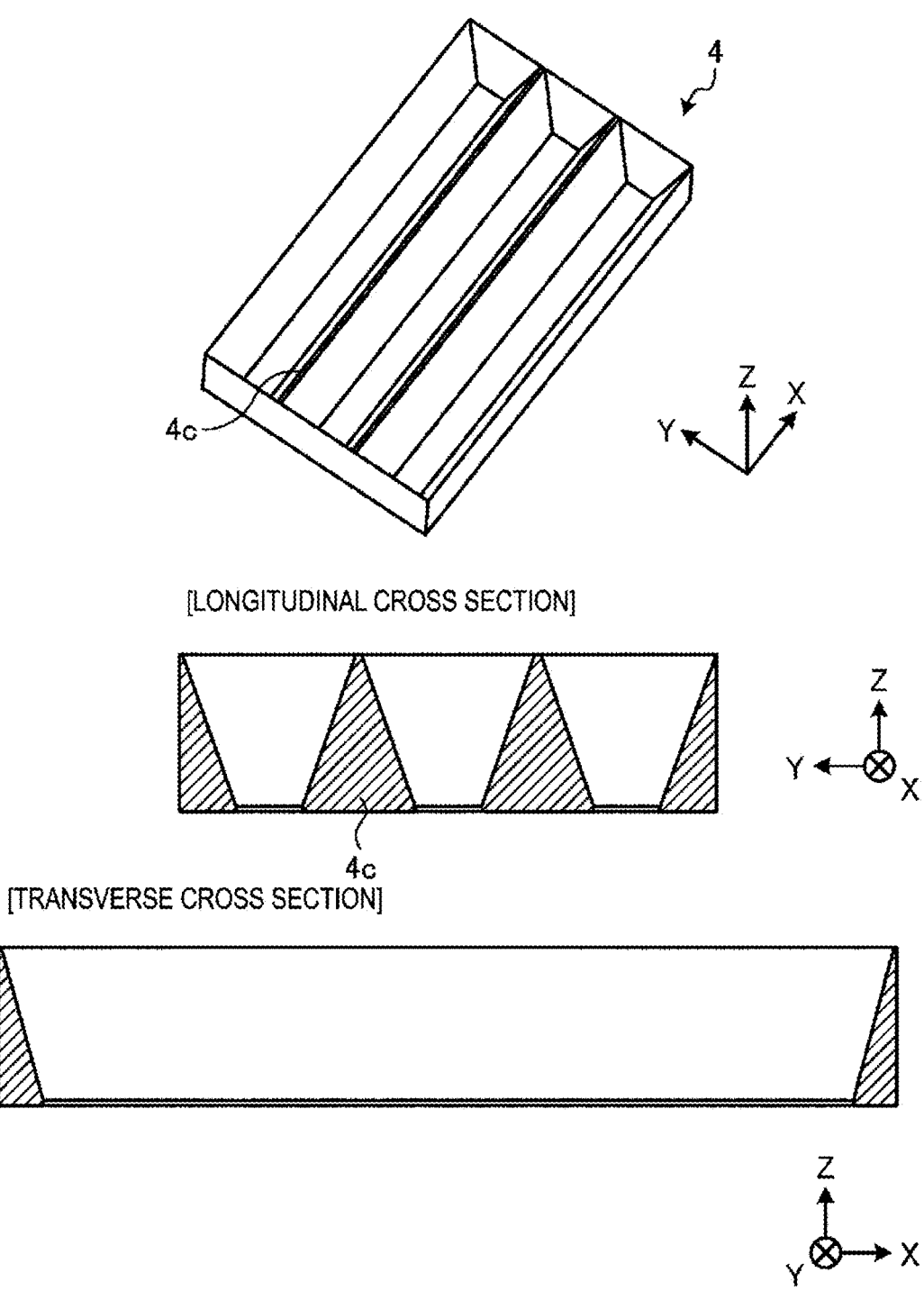
FIG. 22 is a view illustrating a second modification of the reflector.

FIG. 22 is a view illustrating a second modification of the reflector 4. As illustrated in FIG. 22, the second modification of the reflector 4 has a reflector structure such that a reflecting surface extending in the Y-axis direction is not provided between adjacent light sources 3 in the X-axis direction being a direction for a wide visual field.

That is, as illustrated in FIG. 22, the plurality of wall parts 4*c* extend in the X-axis direction, and are arranged in the Y-axis direction at the intervals of the plurality of light sources 3 arranged in the Y-axis direction. Thus, the height of the wall parts 4*c* is defined by the visual field range in the Y-axis direction.

Figure 23:
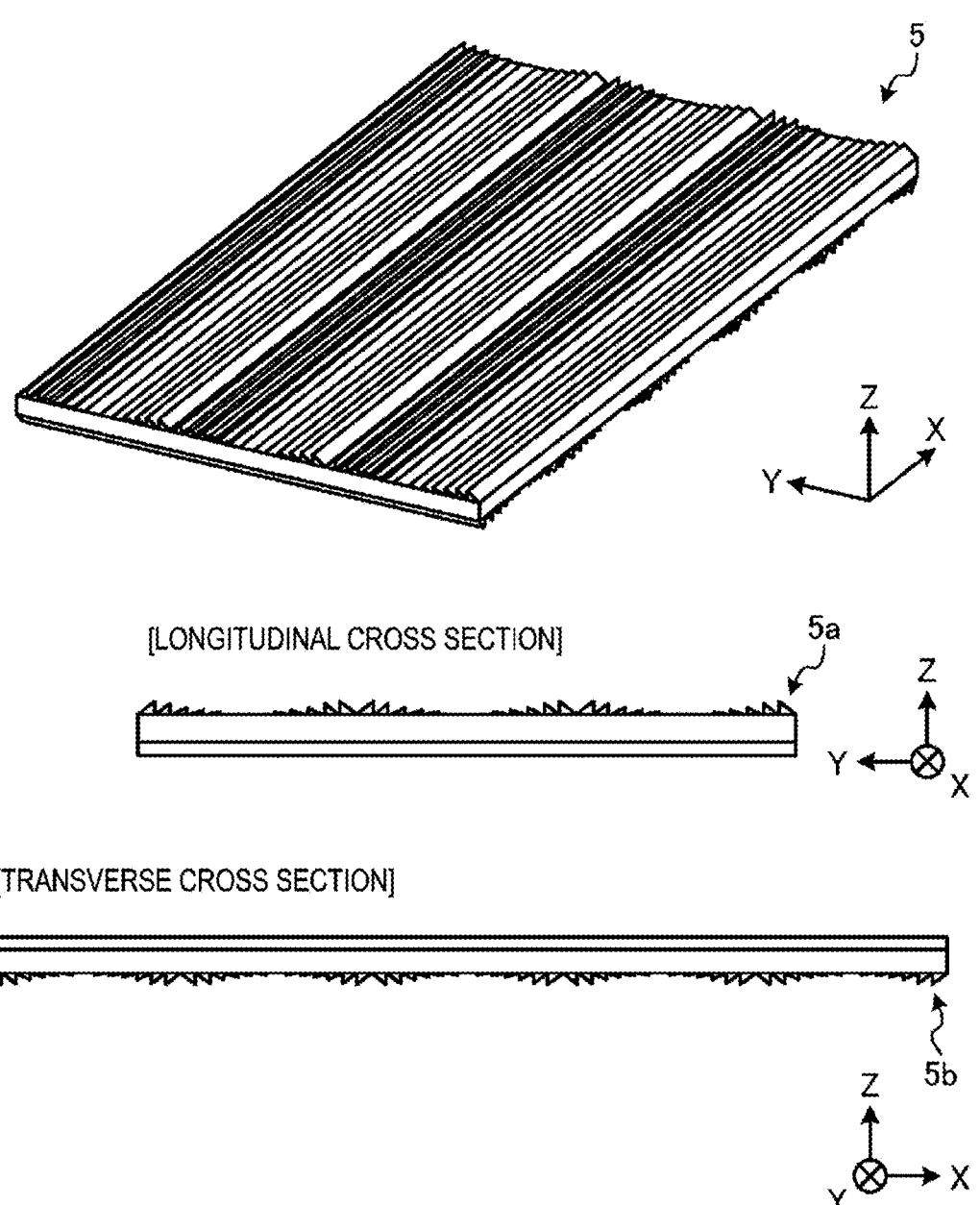
FIG. 23 is a view illustrating a first modification of a condenser lens.

FIG. 23 is a view illustrating a first modification of the condenser lens 5. Although the condenser lens 5 in FIG. 3 and the like described above condenses light only in the Y-axis direction of the substrate 2, light may be condensed in the X-axis direction of the substrate 2 as long as the required light distribution characteristics can be realized.

The condenser lens 5 in the first modification has the linear Fresnel lens 5*a* as a first optical element extending in the X-axis direction and condensing light in the Y-axis direction, and a second linear Fresnel lens 5*b* extending in the Y-axis direction and condensing light in the X-axis direction as illustrated in FIG. 23. The second linear Fresnel lens 5*b* has a prismatic structure with cylindrical convex lenses being used as a Fresnel lens, and has grooves extending in the Y-axis direction. In the second linear Fresnel lens 5*b*, grooves are periodically formed in accordance with the pitch in the X-axis direction of the light sources 3 arranged directly below. Although the second linear Fresnel lens 5*b* is provided at the incidence side and the first linear Fresnel lens 5*a* is provided at the emission side in the condenser lens 5 of the first modification illustrated in FIG. 23, the arrangement may be reversed. Further, this modification is limited to the case of the surface of the condenser lens 5 on the side opposite to the linear Fresnel lens 5*a* not being used for other lens functions.

Figure 24:
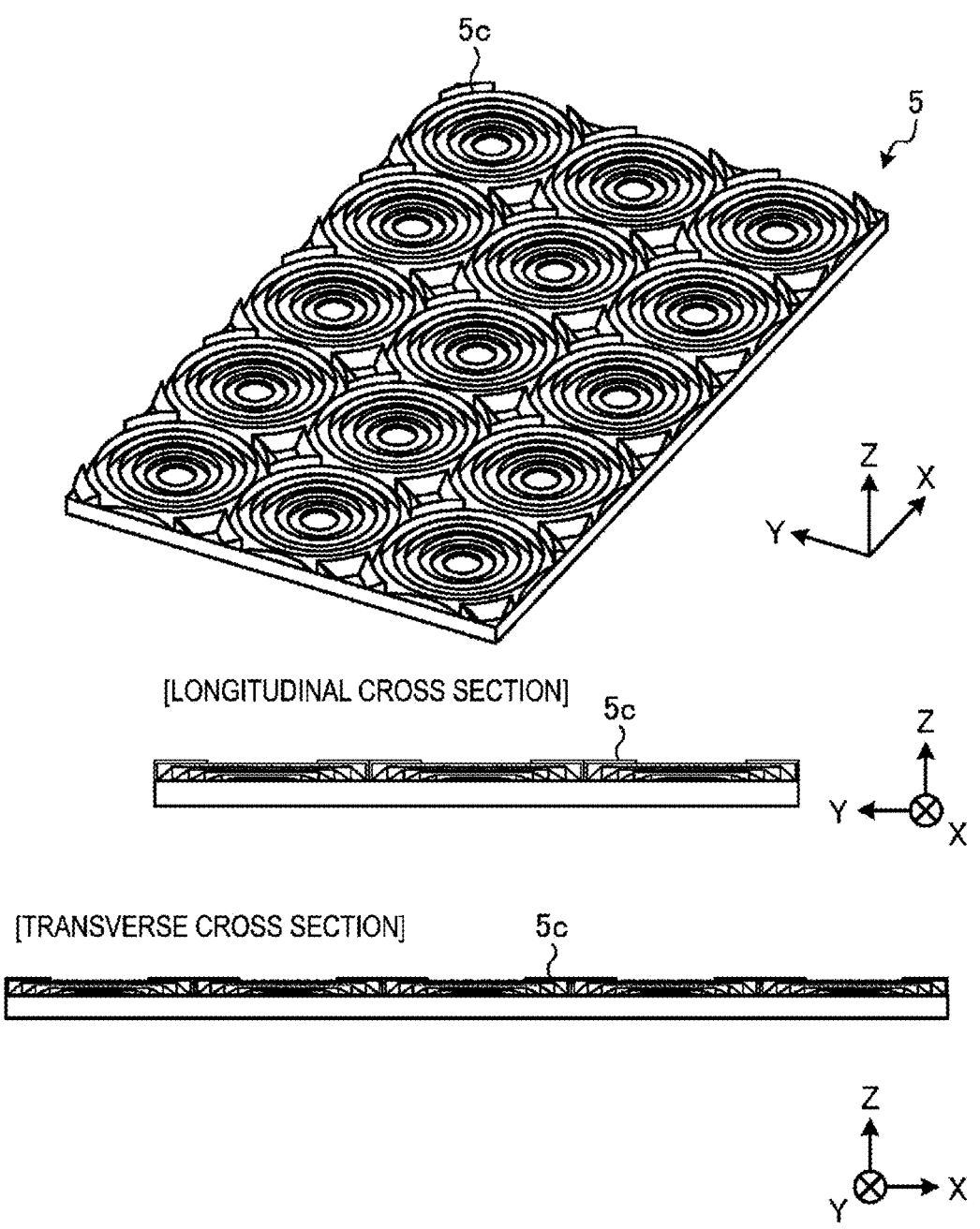
FIG. 24 is a view illustrating a second modification of the condenser lens.

FIG. 24 is a view illustrating a second modification of the condenser lens 5. The second modification of the condenser lens 5 is a modification of the condenser lens 5 having a prismatic structure different from the structure of the first modification of FIG. 23 and condensing light in both the Y-axis direction and the X-axis direction.

Concentric Fresnel lenses 5*c* for condensing light in the Y-axis direction and the X-axis direction are provided as a first optical element as illustrated in FIG. 24. The concentric Fresnel lenses 5*c* are lenses obtained by dividing a convex lens into concentric regions to reduce the thickness, and has a saw-tooth cross section. The number of the concentric Fresnel lenses 5*c* provided corresponds to the number of the light sources 3 arranged directly below. Although the concentric Fresnel lenses 5*c* are provided at the emission side in the second modification of the condenser lens 5 illustrated in FIG. 24, the lenses may be provided at the incidence side.

Further, although, in order to realize the required light distribution characteristics, the case of light distribution control using the prisms such as the linear Fresnel lens 5*a*, the first lenticular lens 7*a*, and the second lenticular lens 7*b* combined with light distribution control using the height of the walls of the reflector 4 has been described in the above-described embodiments and modifications, the invention is not limited to this configuration. As long as the required light distribution characteristics are realized, only the light distribution control using the prisms may be performed, or only the light distribution control using the height of the walls of the reflector 4 may be performed.

Although the embodiments of the present invention have been described above, the present invention is not limited to the above-mentioned embodiments and may be modified in various ways without departing from the gist of the invention.

As described above, the planar illumination device according to an embodiment includes the substrate with a plurality of light sources two-dimensionally arranged, the first optical element arranged at the emission side of the plurality of light sources to condense light emitted from the plurality of light sources, the second optical element arranged at the emission side of the first optical element to tilt light distribution of the light condensed by the first optical element in the first axial direction within the emission surface, the third optical element arranged at the emission side of the second optical element to spread the light tilted by the second optical element in the first axial direction, a pair of fourth and fifth optical elements arranged at the emission side of the plurality of light sources to spread the light in the second axial direction orthogonal to the first axial direction within the emission surface, and the sixth optical element formed by combining the second optical element and the third optical element to substitute for the second optical element and the third optical element. Thus, luminance unevenness and chromaticity unevenness can be reduced, and the number of lenses can be reduced.

In addition, the planar illumination device may include the substrate with a plurality of light sources two-dimensionally arranged, the first optical element arranged at the emission side of the plurality of light sources to condense light emitted from the plurality of light sources, the second optical element arranged at the emission side of the first optical element to tilt light distribution of the light condensed by the first optical element in the first axial direction within the emission surface, the third optical element arranged at the emission side of the second optical element to spread the light tilted by the second optical element in the first axial direction, and the sixth optical element formed by combining the second optical element and the third optical element to substitute for the second optical element and the third optical element. Thus, the number of lenses can be reduced.

In addition, the planar illumination device may include the substrate with a plurality of light sources two-dimensionally arranged, and a pair of fourth and fifth optical elements arranged at the emission side of the plurality of light sources to spread light in the second axial direction within the emission surface. Thus, luminance unevenness and chromaticity unevenness can be reduced.

In addition, the first optical element is a condenser lens, the second optical element is a light distribution lens, and the third optical element is a visual field range adjustment lens. The optical elements can be embodied accordingly.

Furthermore, a linear Fresnel lens is provided on one of the incidence surface and the emission surface of the condenser lens, a linear prism is provided on one of the incidence surface and the emission surface of the light distribution lens, and a lenticular lens is provided on one of the incidence surface and the emission surface of the visual field range adjustment lens. The optical elements can be embodied accordingly.

Furthermore, the fourth and fifth optical elements are lenticular lenses. The optical elements can be embodied accordingly.

In addition, the sixth optical element includes an arc part being convex toward the lens outward side and a cliff part running from one end of the arc part back to the lens inward side. The optical element can be embodied accordingly.

In addition, the present invention is not limited to the embodiments described above. A configuration obtained by appropriately combining the above-mentioned components is also included in the present invention. Furthermore, further effects and modifications can be easily derived by a person skilled in the art. Thus, a wide range of aspects of the present invention is not limited to the embodiments described above and may be modified variously.

REFERENCE SIGNS LIST

1 Planar illumination device
2 Substrate
3 Light source
4 Reflector
4a, 4a-1, 4a-1 Reflecting surface
4b Opening
4c, 4c-1, 4c-2 Wall part
4d Bottom surface
5 Condenser lens
5a, 5b Linear Fresnel lens
5c Concentric Fresnel lens
5d Lenticular lens
5e Lenticular lens
6 Light distribution lens
6a Linear prism
6b Lenticular lens
7 Visual field range adjustment lens
7a, 7b Lenticular lens
9 Frame
9a Opening
10 Light distribution/visual field range adjustment lens
10a Compound prism
10b Lenticular lens
10a1 Arc part
10a2 Start point part
10a3 End point part
10a4 Cliff part

The invention claimed is:

1. A planar illumination device comprising:
a substrate provided with a plurality of light sources;
a first optical element arranged at an emission side of the plurality of light sources to condense light emitted from the plurality of light sources;
a sixth optical element arranged at an emission side of the first optical element and formed by combining a second optical element and a third optical element, wherein the second optical element tilts light distribution of the light condensed by the first optical element in a first axial direction within an emission surface, and the third optical element spreads the light condensed by the first optical element in the first axial direction;
a pair of fourth and fifth optical elements arranged at the emission side of the plurality of light sources to spread the light in a second axial direction orthogonal to the first axial direction within the emission surface.

2. The planar illumination device according to claim 1, wherein
the first optical element is a condenser lens,
the second optical element is a light distribution lens, and
the third optical element is a visual field range adjustment lens.

3. The planar illumination device according to claim 2, wherein a linear Fresnel lens is provided on one of an incidence surface or an emission surface of the condenser lens, a linear prism is provided on one of an incidence surface or an emission surface of the light distribution lens, and a lenticular lens is provided on one of an incidence surface or an emission surface of the visual field range adjustment lens.

4. The planar illumination device according to claim 1, wherein the fourth and fifth optical elements are lenticular lenses.

5. The planar illumination device according to claim 1, wherein the sixth optical element includes an arc part being convex toward a lens outward side and a cliff part running from one end of the arc part back to a lens inward side.

6. The planar illumination device according to claim 1, wherein the fourth and fifth optical elements are different in the degree of diffusion of light from each other.

7. A planar illumination device comprising:

a substrate provided with a plurality of light sources;

a first optical element arranged at an emission side of the plurality of light sources to condense light emitted from the plurality of light sources; and a sixth optical element arranged at an emission side of the first optical element and formed by combining a second optical element and a third optical element, wherein the second optical element tilts light distribution of incident light incident thereon in a first axial direction within an emission surface, and the third optical element spreads the incident light incident thereon in the first axial direction, and the second optical element has an optical function and the third optical element has an optical function that are caused to act simultaneously on the light condensed by the first optical element.

8. The planar illumination device according to claim 7, wherein the first optical element condenses light emitted from each of the plurality of light sources into one beam.

9. The planar illumination device according to claim 7, wherein the third optical element has a function that allows parallel light incident thereon to spread in the first axial direction.

10. The planar illumination device according to claim 7, wherein the first optical element condenses the light emitted from the plurality of light sources into substantially parallel light.

11. The planar illumination device according to claim 7, wherein the sixth optical element includes an arc part being convex toward a lens outward side and a cliff part running from one end of the arc part back to a lens inward side.

12. The planar illumination device according to claim 7, wherein the third optical element spreads the incident light in the first axial direction that is different from the second axial direction orthogonal to the first axial direction.

13. A planar illumination device comprising:

a substrate provided with a plurality of light sources;

a first optical element arranged at an emission side of the plurality of light sources to condense light emitted from the plurality of light sources in a first axial direction;

a fourth optical element arranged at an emission side of the first optical element to spread light in a second axial direction orthogonal to the first axial direction within an emission surface; and a fifth optical element arranged at an emission side of the fourth optical element to spread light in the second axial direction.

14. The planar illumination device according to claim 13, wherein the fourth and fifth optical elements are different in the degree of diffusion of light from each other.

\* \* \* \* \*